United States Patent
Melkote Krishnaprasad et al.

(10) Patent No.: US 11,064,228 B2
(45) Date of Patent: Jul. 13, 2021

(54) AUDIO PLAYBACK TIMING ADJUSTMENT

(71) Applicant: QUALCOMM Incorporated, San Diego, CA (US)

(72) Inventors: Vinay Melkote Krishnaprasad, Bangalore (IN); Shraman Biswas, Bangalore (IN); Sandeep Kanakapura Lakshmikantha, Ramanagar District (IN); Ajit Venkat Rao, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/830,060

(22) Filed: Mar. 25, 2020

(65) Prior Publication Data
US 2020/0322649 A1 Oct. 8, 2020

(30) Foreign Application Priority Data
Apr. 2, 2019 (IN) .............................. 201941013244

(51) Int. Cl.
*H04N 21/236* (2011.01)
*G02B 27/01* (2006.01)
*G06F 3/01* (2006.01)
*H04N 21/233* (2011.01)
*H04N 21/242* (2011.01)
(Continued)

(52) U.S. Cl.
CPC ....... *H04N 21/236* (2013.01); *G02B 27/0172* (2013.01); *G06F 3/012* (2013.01); *G06F 3/017* (2013.01); *G06T 19/006* (2013.01); *H04L 65/4069* (2013.01); *H04L 65/60* (2013.01);
(Continued)

(58) Field of Classification Search
CPC .. H04N 21/236; H04N 21/233; H04N 21/242; H04N 21/234; H04N 21/8547; H04N 21/4307; H04N 21/439; H04N 21/8106; G06T 19/006; H04L 65/4069; H04L 65/60; H04L 65/607; H04L 65/4092; H04L 65/80; H04L 65/608; H04L 65/602;
(Continued)

(56) References Cited

U.S. PATENT DOCUMENTS 6,598,172 B1 * 7/2003 VanDeusen ........... H04J 3/0632
370/389
2015/0094834 A1 * 4/2015 Vega ...................... G06F 3/162
700/94
(Continued)

FOREIGN PATENT DOCUMENTS

CN 1614994 * 5/2005 ............... H04N 5/04
CN 1614994 A * 5/2005 ............... H04N 5/04
(Continued)

*Primary Examiner* — Robert J Hance
(74) *Attorney, Agent, or Firm* — Moore Intellectual Property Law, PLLC

(57) ABSTRACT

A server includes a processor configured to determine, based on reception of information from a client device, synchronization parameters between a server clock rate associated with the server and a client clock rate associated with the client device. The processor is also configured to determine a client-side generation timestamp for an audio frame based on the synchronization parameters and based on a server-side generation timestamp for the audio frame. The processor is further configured to generate the audio frame. The audio frame includes the client-side timestamp.

30 Claims, 13 Drawing Sheets

(51) Int. Cl.
    *H04N 21/234*    (2011.01)
    *G06T 19/00*     (2011.01)
    *H04L 29/06*     (2006.01)

(52) U.S. Cl.
    CPC ......... *H04N 21/233* (2013.01); *H04N 21/234* (2013.01); *H04N 21/242* (2013.01)

(58) Field of Classification Search
    CPC ..... G02B 27/0172; G06F 9/451; G06F 3/011; G06F 3/012; G06F 3/017; G06F 3/165
    See application file for complete search history.

(56) References Cited

U.S. PATENT DOCUMENTS

| | | | |
|---|---|---|---|
| 2015/0245306 A1* | 8/2015 | Boehlke ........... | H04N 21/43637 370/350 |
| 2017/0181113 A1* | 6/2017 | Keyser-Allen ..... | H04N 21/4307 |
| 2018/0262792 A1* | 9/2018 | Mackay ........... | H04N 21/43076 |
| 2019/0042525 A1* | 2/2019 | McElrath .............. | G06F 9/4887 |

FOREIGN PATENT DOCUMENTS

| | | | | |
|---|---|---|---|---|
| WO | WO-2013147901 A1 * | 10/2013 | ............. | H04R 3/005 |
| WO | WO-2017058654 A1 * | 4/2017 | ........ | H04N 21/44227 |
| WO | WO-2018152242 A1 * | 8/2018 | ............. | G06F 3/165 |

\* cited by examiner

AUDIO PLAYBACK TIMING ADJUSTMENT

I. CROSS-REFERENCE TO RELATED APPLICATIONS

The present application claims priority from India Provisional Patent Application No. 201941013244, filed Apr. 2, 2019, entitled "AUDIO PLAYBACK TIMING ADJUSTMENT," which is incorporated herein by reference in its entirety.

II. FIELD

The present disclosure is generally related to playback of audio content.

III. DESCRIPTION OF RELATED ART

Advances in technology have resulted in smaller and more powerful computing devices. For example, there currently exist a variety of portable personal computing devices, including wireless telephones such as mobile and smart phones, tablets, and laptop computers that are small, lightweight, and easily carried by users. These mobile devices can communicate voice and data packets over wireless networks. Further, many such devices incorporate additional functionality such as a digital still camera, a digital video camera, a digital recorder, and an audio file player. Also, such mobile devices can process executable instructions, including software applications, such as a web browser application, that can be used to access the Internet. As such, these mobile devices can include significant computing capabilities.

Some mobile devices support virtual reality (VR) or augmented reality (AR) applications in which audio and video content is generated by a server and transmitted to the mobile device for playback. VR video content is typically not buffered at the mobile device and instead is played back as it is received at the mobile device in order to minimize motion-to-photo latency for the user of the mobile device. For example, when the mobile device includes a VR headset, video content should be played out as soon as possible so that the video experienced by the user closely matches changes in the user's head position and orientation. Typically, audio content is also generated and transmitted from the server to the mobile device for synchronized playback with the video content.

However, when video content that is generated by a server and sent to the mobile device experiences transmission delays or failures, such as due to network congestion or network component failure, it can be beneficial to maintain audio transmission and playback at the mobile device until the video content transmission can be restored. In such cases, when audio and video content are not transmitted together, synchronization of the video content to the audio content can be maintained if the audio content plays back on the mobile device at the same rate that it is being generated at the server and with a fixed latency. However, audio-video synchronization can be lost due to variable transmission latency of the audio content across a network, due to clock drift between a clock used by the mobile device and a clock used at the server, due to one or more other reasons, or any combination thereof. In addition, playback of the audio content itself can be impaired due to buffer overflow when the mobile device is playing the audio content too slowly relative to the sampling rate of the audio content at the server, or due to buffer underflow when the mobile device is playing out the audio content too quickly relative to the sampling rate at the server.

IV. SUMMARY

According to a particular implementation of the techniques disclosed herein, an apparatus includes a server. The server includes a processor configured to determine, based on reception of information from a client device, synchronization parameters between a server clock rate associated with the server and a client clock rate associated with the client device. The processor is also configured to determine a client-side timestamp for an audio frame based on the synchronization parameters and a server-side timestamp for the audio frame. The processor is further configured to generate the audio frame. The audio frame includes the client-side timestamp.

According to another particular implementation of the techniques disclosed herein, a method of generating timing information for a client device includes receiving, at a server, information from the client device. The method also includes determining, based on reception of the information, synchronization parameters between a server clock rate associated with the server and a client clock rate associated with the client device. The method also includes determining a client-side timestamp for an audio frame based on the synchronization parameters and a server-side timestamp for the audio frame. The method further includes generating the audio frame. The audio frame includes the client-side timestamp. The method also includes transmitting the audio frame to the client device to enable the client device to playout the audio frame based on the client-side timestamp.

According to another particular implementation of the techniques disclosed herein, a non-transitory computer-readable medium includes instructions for generating timing information for a client device. The instructions, when executed by one or more processors of a server, cause the one or more processors to perform operations including determining, based on reception of information from the client device, synchronization parameters between a server clock rate associated with the server and a client clock rate associated with the client device. The operations also include determining a client-side timestamp for an audio frame based on the synchronization parameters and a server-side timestamp for the audio frame. The operations further include generating the audio frame. The audio frame includes the client-side timestamp. The operations also include initiating transmission of the audio frame to the client device to enable the client device to playout the audio frame based on the client-side timestamp.

According to another particular implementation of the techniques disclosed herein, an apparatus includes means for receiving information form a client device. The apparatus also includes means for determining, based on reception of the information, synchronization parameters between a server clock rate associated with a server and a client clock rate associated with the client device. The apparatus also includes means for determining a client-side timestamp for an audio frame based on the synchronization parameters and a server-side timestamp for the audio frame. The apparatus further includes means for generating the audio frame. The audio frame includes the client-side timestamp. The apparatus also includes means for transmitting the audio frame to the client device to enable the client device to playout the audio frame based on the client-side timestamp.

According to another particular implementation of the techniques disclosed herein, an apparatus includes a client device. The client device includes a processor configured to receive a plurality of audio frames from a server. Each audio frame of the plurality of audio frames includes a corresponding server-side timestamp indicating a generation time of the corresponding audio frame. The processor is also configured to determine a server-side sampling frequency based on the server-side timestamps. The processor is further configured to adjust a playback rate at the client device to match the server-side sampling frequency.

According to another particular implementation of the techniques disclosed herein, a method of adjusting a playback rate includes receiving, at a client device, a plurality of audio frames from a server. Each audio frame of the plurality of audio frames includes a corresponding server-side timestamp indicating a generation time of the corresponding audio frame. The method also includes determining a server-side sampling frequency based on the server-side timestamps. The method further includes adjusting the playback rate at the client device to match the server-side sampling frequency.

According to another particular implementation of the techniques disclosed herein, a non-transitory computer-readable medium includes instructions for adjusting a playback rate. The instructions, when executed by one or more processors of a client device, cause the one or more processors to perform operations including receiving a plurality of audio frames from a server. Each audio frame of the plurality of audio frames includes a corresponding server-side timestamp indicating a generation time of the corresponding audio frame. The operations also include determining a server-side sampling frequency based on the server-side timestamps. The operations further include adjusting the playback rate at the client device to match the server-side sampling frequency.

According to another particular implementation of the techniques disclosed herein, an apparatus includes means for receiving a plurality of audio frames from a server. Each audio frame of the plurality of audio frames includes a corresponding server-side timestamp indicating a generation time of the corresponding audio frame. The apparatus also includes means for determining a server-side sampling frequency based on the server-side timestamps. The apparatus further includes means for adjusting a playback rate at the client device to match the server-side sampling frequency.

According to another particular implementation of the techniques disclosed herein, a method of adjusting a playback rate includes receiving, at a client device, a plurality of audio frames from a server. Each audio frame of the plurality of audio frames includes a corresponding server-side timestamp indicating a generation time of the corresponding audio frame in a server-clock domain and a corresponding client-side timestamp indicating the generation time of the corresponding audio frame in a client-clock domain. The method further includes adjusting the playback rate at the client device based on the client-side timestamps.

According to another particular implementation of the techniques disclosed herein, an apparatus includes a client device. The client device includes a receiver configured to receive a plurality of audio frames from a server. Each audio frame of the plurality of audio frames includes a corresponding server-side timestamp indicating a generation time of the corresponding audio frame in a server-clock domain and a corresponding client-side timestamp indicating the generation time of the corresponding audio frame in a client-clock domain. The client device also includes a processor coupled to the receiver. The processor is configured to adjust the playback rate at the client device based on the client-side timestamps.

According to another particular implementation of the techniques disclosed herein, a non-transitory computer-readable medium includes instructions for adjusting a playback rate. The instructions, when executed by one or more processors of a client device, cause the one or more processors to perform operations including receiving a plurality of audio frames from a server. Each audio frame of the plurality of audio frames includes a corresponding server-side timestamp indicating a generation time of the corresponding audio frame in a server-clock domain and a corresponding client-side timestamp indicating the generation time of the corresponding audio frame in a client-clock domain. The operations also include adjusting the playback rate at the client device based on the client-side timestamps.

According to another particular implementation of the techniques disclosed herein, an apparatus includes means for receiving a plurality audio frames from a server. Each audio frame of the plurality of audio frames includes a corresponding server-side timestamp indicating a generation time of the corresponding audio frame in a server-clock domain and a corresponding client-side timestamp indicating the generation time of the corresponding audio frame in a client-clock domain. The apparatus also includes means for adjusting the playback rate at a client device based on the client-side timestamps.

According to another particular implementation of the techniques disclosed herein, an apparatus includes a server that includes a processor configured to determine, based on reception of information from a client device, synchronization parameters between a server clock rate associated with the server and a client clock rate associated with the client device. The processor is also configured to determine a server-side sampling rate for audio data based on the synchronization parameters and to generate the audio data based on the server-side sampling rate.

According to another particular implementation of the techniques disclosed herein, a method of audio generation includes determining, based on reception of information from a client device, synchronization parameters between a server clock rate associated with the server and a client clock rate associated with the client device. The method also includes determining a server-side sampling rate for audio data based on the synchronization parameters. The method further includes generating the audio data based on the server-side sampling rate.

According to another particular implementation of the techniques disclosed herein, a non-transitory computer-readable medium includes instructions for audio generation. The instructions, when executed by one or more processors of a server device, cause the one or more processors to perform operations including determining, based on reception of information from a client device, synchronization parameters between a server clock rate associated with the server and a client clock rate associated with the client device. The operations also include determining a server-side sampling rate for audio data based on the synchronization parameters. The operations further include generating the audio data based on the server-side sampling rate.

According to another particular implementation of the techniques disclosed herein, an apparatus includes means for determining, based on reception of information from a client device, synchronization parameters between a server clock rate associated with the server and a client clock rate associated with the client device. The apparatus also includes means for determining a server-side sampling rate for audio data based on the synchronization parameters. The apparatus further includes means for generating the audio data based on the server-side sampling rate.

One advantage of the above-described implementations is that audio playback at a client device can be maintained at a rate that matches a generation rate of the audio content at a server. Matching the audio playback and the generation rate reduces or eliminates a possibility of a buffer overflow or underflow event at the client device. Matching the audio playback rate and generation rate enables a buffer occupancy to be adjusted toward a target occupancy by making a temporary adjustment of the audio playback rate at the client device, enabling the client device to reduce audio playback latency while accommodating for expected jitter in network transmission of the audio content. Synchronization between audio and video streams from a server to a client device can be maintained during periods when network issues prevent reliable transmission of video content and variable transmission latency of the audio content, when clock drift occurs between the client device and the server, or both.

Other implementations, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
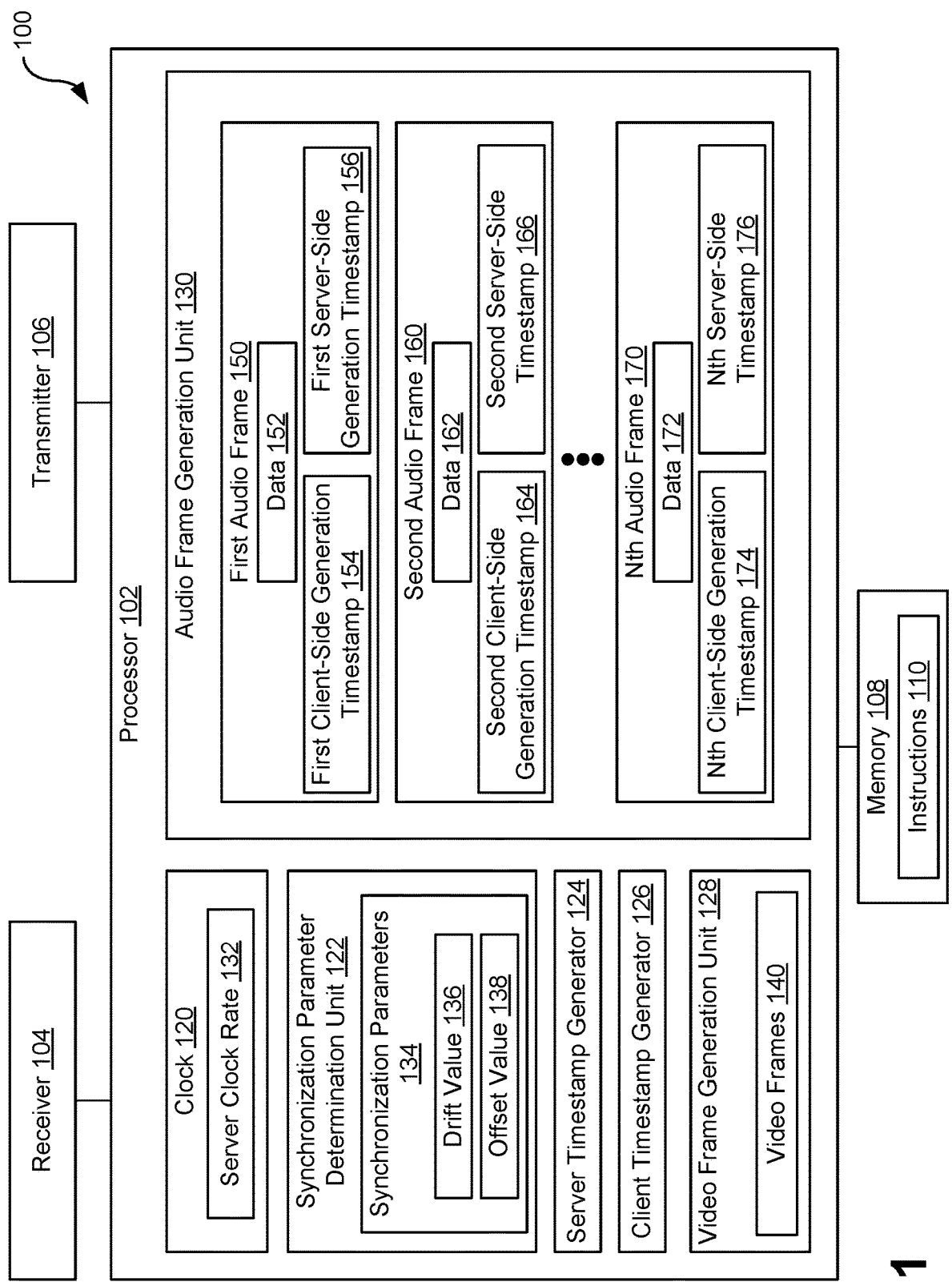
FIG. 1 is a diagram of an example of a server that is operable to generate timing information for a client device.

In systems where audio content is generated at a server and transmitted to a client device for playback, such as in a VR application, offset or drift between a clock at the server used for generation of audio content and a clock at the client device used for audio playback can impair playback of the audio content due to buffer overflow or underflow at the client device. In a VR application in which video streaming from the server to the client device is interrupted while audio streaming is maintained, such offset or drift between the clock at the server and the clock at the client device can result in loss of synchronization of the video content to the playout of the audio content.

Systems and methods to provide audio playback timing adjustment are described. In some implementations, a server uses client-side timestamps in transmissions that are received from a client device to determine an offset or drift between a clock at the server and a clock at the client device. For example, in a VR application, the client-side timestamps can be received in transmissions from the client device that indicate pose information of the client device, such as a position and orientation of a head mounted display. The server can adjust the sampling rate for the audio content to compensate for the effect of the clock drift on playback of the audio content at the client device. Alternatively, in some implementations, the server can translate server-side timestamps corresponding to the audio frames to client-side timestamps based on the determined clock offset and drift. The server can send the client-side timestamps to the client device with the audio frames for use by the client device to control the playback rate of the audio content at the client device.

In other implementations, a client device can determine an offset or drift between a clock at the server and a clock at the client device based on server-side timestamps received with audio content and further based on client-side time stamps indicating reception of the audio content at the client device. The client device can adjust a playback rate of the audio content based on the detected offset or drift.

In any of the above-described implementations, the client device can temporarily adjust the playback rate to modify an occupancy of a jitter buffer at the client device that stores received audio frames. For example, the client device may temporarily increase the playback rate for a predetermined time period to reduce a number of audio frames in the jitter buffer.

By adjusting the audio sampling rate at the server, adding client-side timestamps to the audio stream transmitted by the server, or adjusting the playback rate at the client device based on determination of clock drift, an audio generation rate at the server and audio playback rate at the client device may substantially match in spite of clock drift or offset between the server and the client device. As a result, interruptions of the audio playback due to buffer overflow or underflow can be reduced or eliminated. In VR applications, substantially maintaining the match between the audio generation rate at the server and the audio playback rate at the client device enables synchronization to be maintained between an audio stream and a video stream during periods of video stream interruption to the client device.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, there may be other blocks or components between the structures being "coupled".

In the present disclosure, terms such as "determining", "calculating", "detecting", "estimating", "shifting", "adjusting", etc. may be used to describe how one or more operations are performed. It should be noted that such terms are not to be construed as limiting and other techniques may be utilized to perform similar operations. Additionally, as referred to herein, "generating", "calculating", "estimating", "using", "selecting", "accessing", and "determining" may be used interchangeably. For example, "generating", "calculating", "estimating", or "determining" a parameter (or a signal) may refer to actively generating, estimating, calculating, or determining the parameter (or the signal) or may refer to using, selecting, or accessing the parameter (or signal) that is already generated, such as by another component or device.

FIG. 1 is a diagram of an example of a server 100 that is operable to generate timing information for a client device. The server 100 includes one or more processors that are illustrated as a processor 102. The processor 102 is coupled to a receiver 104, a transmitter 106, and a memory 108. The memory 108 is a non-transitory computer-readable medium that includes instructions 110. The instructions 110 are executable by the processor 102 to perform the techniques described herein. According to one implementation, the server 100 can be a video gaming server that is operable to transmit audio streams and video streams associated with the video game to a client device, such as a client device 200 as described with respect to FIG. 2. The client device 200 can be a head mounted device, such as a virtual reality device, a mixed reality device, or an augmented reality device.

Figure 4:
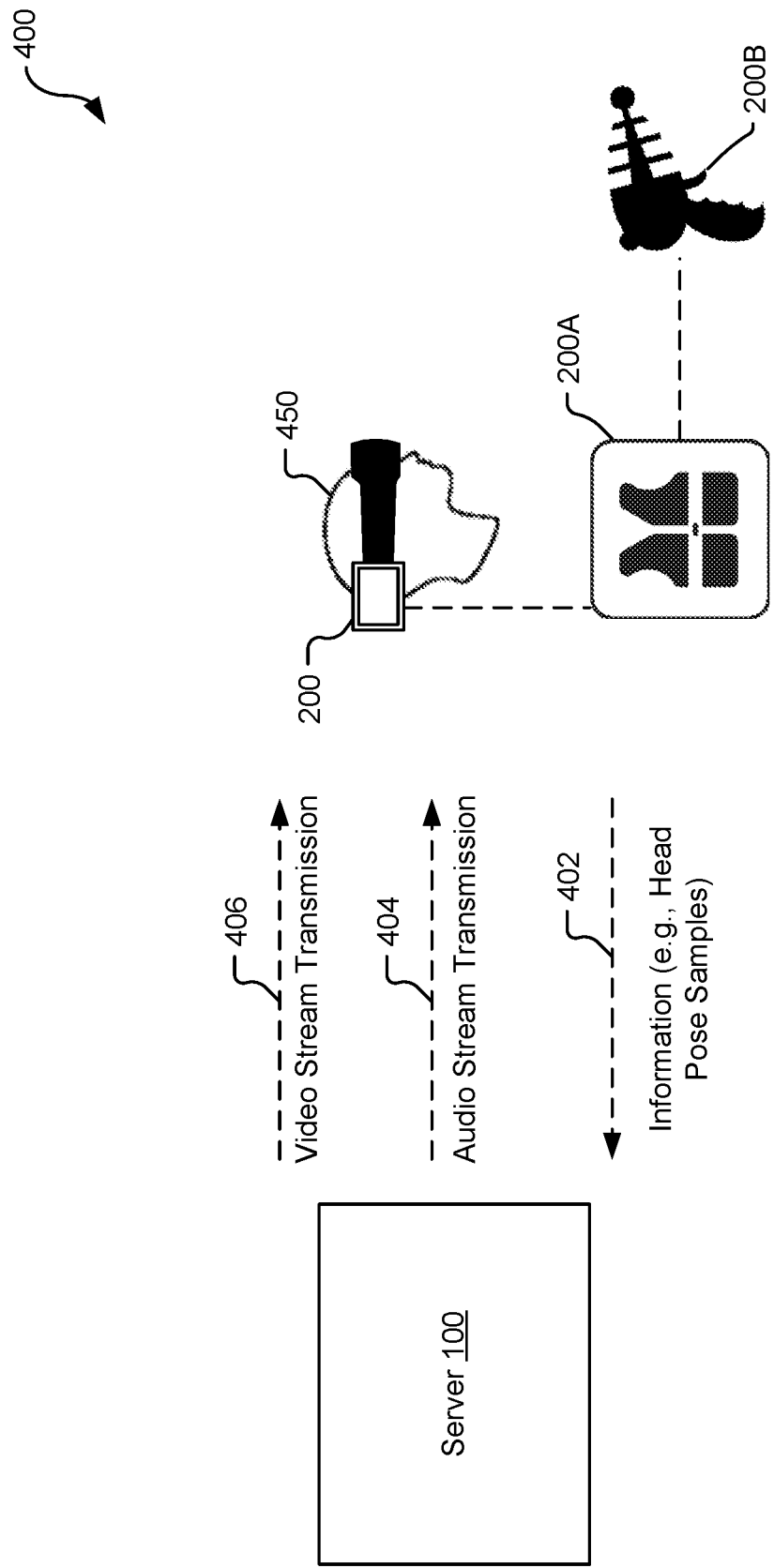
FIG. 4 is a diagram of an example of a system that includes the server of FIG. 1 and the client device of FIG. 2.

The receiver 104 is configured to receive information, such as information 402 of FIG. 4, from the client device 200. For example, in an implementation where the client device 200 is a head mounted device, the information 402 can include a plurality of head pose samples that are received as transmissions from the client device 200, such as periodic transmissions. Each head pose sample can be indicative of an orientation of the client device 200 at a corresponding time, such as, based on a periodic interval. For example, the receiver 104 can receive a first head pose sample at a first reception time, a second head pose sample at a second reception time, a third head pose sample at a third reception time, etc. The first head pose sample can indicate the orientation of the client device 200 at a time the first head pose sample was generated, the second head pose sample can indicate the orientation of the client device 200 at a time the second head pose sample was generated, the third head pose sample can indicate the orientation of the client device 200 at the time the third head pose sample was generated, etc. The receiver 104 provides the information 402 (e.g., the plurality of head pose samples) to the processor 102. Although head pose samples are described above, in other implementations, the information 402 received from the client device 200 can be other information, such as location information, power level information, other sensor information, etc.

The processor 102 includes a clock 120, a synchronization parameter determination unit 122, a server timestamp generator 124, a client timestamp generator 126, a video frame generation unit 128, and an audio frame generation unit 130. The clock 120 of the processor 102 operates at a server clock rate 132. Nominally, audio may be generated at 48 kilohertz (kHz) sampling frequency as per the server clock rate 132 and played back/consumed by the client device at 48 kHz sampling frequency in the client clock rate. However, the server clock rate 132 and client clock rate may not match, which means that what the client device "thinks" to be 48 kHz in its native clock is in reality 47 kHz when translated into the server clock. In such a case, even if the server and client devices are both nominally operating at 48 kHz in their individual clocks, the audio consumption on the client device is actually at a lower rate than at the server. Although a 48 kHz sampling frequency based on the server clock rate is used in the examples provided herein, unless otherwise noted, the 48 kHz sampling frequency is provided merely as an illustrative, non-limiting example for ease of description.

Figure 2:
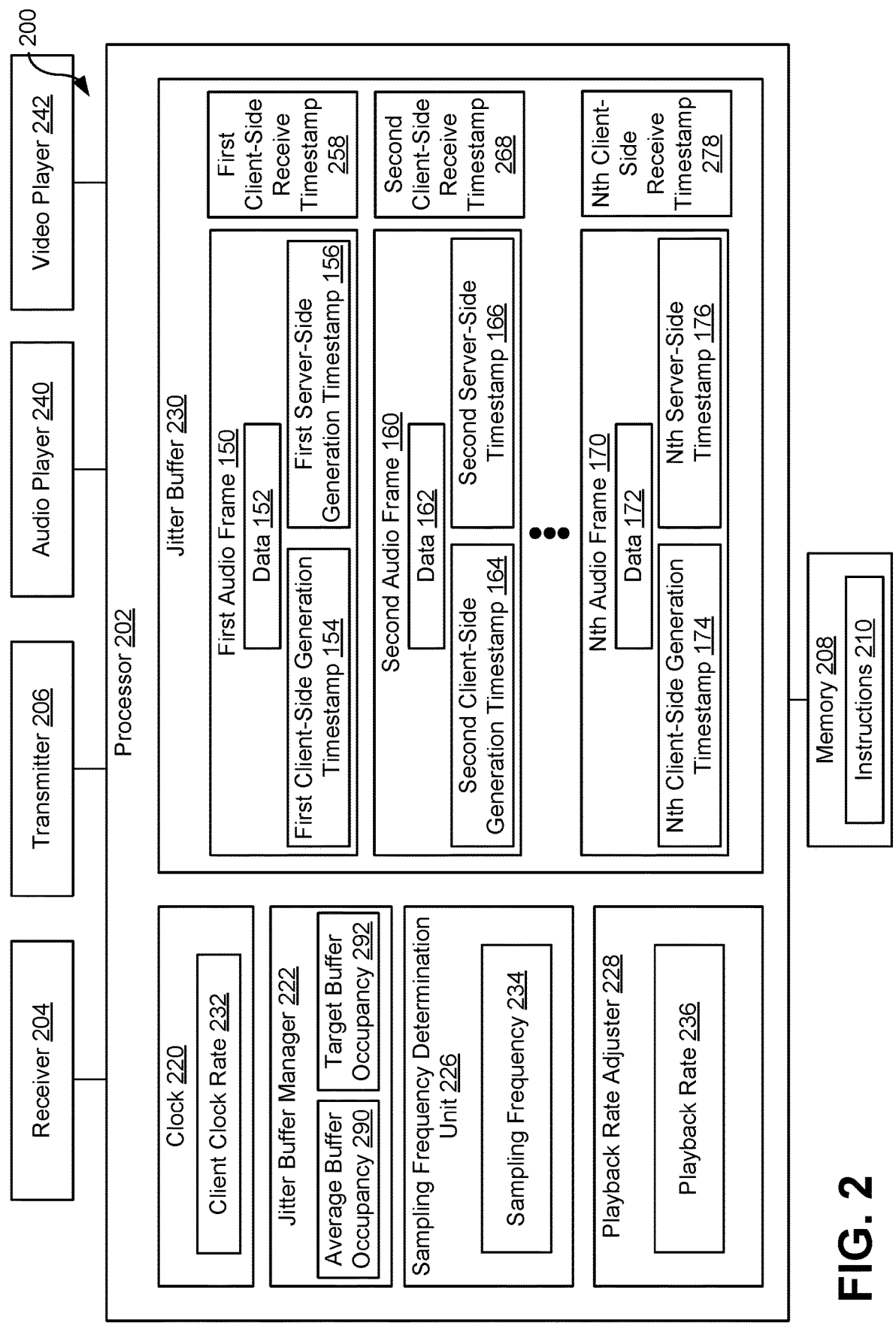
FIG. 2 is a diagram of an example of a client device that is operable to adjust a playback rate.

The processor 102 is configured to determine synchronization parameters 134 between the server clock rate 132 associated with the server 100 and a client clock rate, such as a client clock rate 232 as described with respect to FIG. 2, associated with the client device 200. For example, the synchronization parameter determination unit 122 can determine, based on reception of the information 402 (e.g., the head pose samples) from the client device 200, the synchronization parameters 134 between the server clock rate 132 and the client clock rate 232. The synchronization parameters 134 can include a drift value 136 that is indicative of a drift between the server clock rate 132 and the client clock rate 232. The synchronization parameters 134 can also include an offset value 138 that is indicative of an offset between a server clock value and a client clock value. The drift value 136 and the offset value 138 can be determined and updated, by the synchronization parameter determination unit 122, using a least squares estimation over a window of the last M head pose samples received, where M is any integer number greater that two (2). As a non-limiting example, if M is equal to fifty (50), the drift value 136 and the offset value 138 can be determined and updated using a least squares estimation over a window of the last fifty (50) head pose samples received.

To illustrate, determination of the drift value 136 can be based on client-side timestamps associated with the head pose samples generated at the client device 200. For example, whenever a head pose sample with a client-side timestamp (y) arrives at the server 100 at a time (x), the drift value 136 can be determined using the following formula:

$$\text{drift} = \frac{M\sum xy - (\sum x)(\sum y)}{M(\sum x^2) - (\sum x)^2}$$

Thus, determination of the drift between the server clock rate 132 and the client clock rate 232 includes reception of the first head pose sample of the plurality of head pose samples at the first time ($x_1$), reception of the second head pose sample of the plurality of head pose samples at the second time ($x_2$), and performance of the least squares estimation. The first head pose sample includes a first client-side timestamp ($y_1$) indicating a generation time of the first head pose sample, and the second head pose sample includes a second client-side timestamp ($y_2$) indicating a generation time of the second head pose sample. As shown by the formula above, the least squares estimation is based on at least time associated with the first client-side time stamp, the first time ($x_1$), a time associated with the second client-side timestamp, and the second time ($x_2$).

Determination of the offset value 138 can be based on the drift value 136, a mean time associated with the client-side timestamps used in determining the drift value 136, and a mean time of reception for head pose samples used in determining the drift value 136. To illustrate, the synchronization parameter determination unit 122 can determine the offset using the following formula:

$$\text{offset} = \bar{y} - (\text{drift})(\bar{x})$$

Thus, the synchronization parameter determination unit 122 can determine the offset based on the drift, the mean time ($\bar{y}$) associated with the client-side timestamps used in determining the drift, and the mean time ($\bar{x}$) of reception for head pose samples used in determining the drift. The least squares estimation can be used to ensure that the drift and the offset computations are robust to network jitter.

The audio frame generation unit 130 is configured to generate a plurality of audio frames 150, 160, 170 that are to be transmitted to the client device 200 as part of an audio stream transmission, such as an audio stream transmission 404 as depicted in FIG. 4. For example, the audio frame generation unit 130 can generate a first audio frame 150, a second audio frame 160, and an Nth audio frame 170, where N is any integer value greater than two. As a non-limiting example, if N is equal to sixty-four (64), the audio frame generation unit 130 can generate sixty-four (64) audio frames. The server timestamp generator 124 can generate a first server-side generation timestamp 156 indicating when the first audio frame 150 is generated by the audio frame generation unit 130, a second server-side generation timestamp 166 indicating when the second audio frame 160 is generated by the audio frame generation unit 130, and an Nth server-side generation timestamp 176 indicating when the Nth audio frame 170 is generated by the audio frame generation unit 130.

The processor 102 is further configured to determine a client-side timestamp for an audio frame based on the synchronization parameters 134 and a server-side timestamp for the audio frame. To illustrate, the client timestamp generator 126 is configured to determine a first client-side generation timestamp 154 for the audio frame 150 based on the synchronization parameters 134 and the first server-side generation timestamp 156, a second client-side generation timestamp 164 for the audio frame 160 based on the synchronization parameters 134 and the second server-side generation timestamp 166, and an Nth client-side generation timestamp 174 for the audio frame 170 based on the synchronization parameters 134 and the Nth server-side generation timestamp 176. For example, the client-side generation timestamps ($ts_{client}$) 154, 164, 174 can be determined using the respective server-side generation timestamps ($ts_{server}$) 156, 166, 176 according to the following formula:

$$ts_{client} = (ts_{server})(\text{drift}) + \text{offset}$$

Thus, the server 100 can periodically receive a proxy for the client clock rate 232 in the form of head pose samples and can use the proxy to determine client-side generation timestamps ($ts_{client}$) 154, 164, 174 that indicate when corresponding audio frames 150, 160, 170 are generated according to a client-clock domain.

The first audio frame 150 includes data 152, the first client-side generation timestamp 154, and the first server-side generation timestamp 156. The second audio frame 160 includes data 162, the second client-side generation timestamp 164, and the second server-side generation timestamp 166. The Nth audio frame 170 includes data 172, the Nth client-side generation timestamp 174, and the Nth server-side generation timestamp 176. In some implementations, when a new audio frame is generated at the audio frame generation unit 130 at a time associated with a server-side timestamp ($ts_{server}$), a corresponding real-time transport protocol (RTP) packet includes a computed client-side timestamp ($ts_{client}$) based on the latest drift and offset. The data 152, 162, 172 can include audio that is to be decoded and played out at the client device 200.

The video frame generation unit 128 is configured to generate video frames 140 that are to be sent to the client device 200. In some implementations, each video frame 140 can include a server-side timestamp (not shown) and a client-side timestamp. For example, a first video frame 140 can include the first server-side generation timestamp 156 and the first client-side generation timestamp 154, a second video frame 140 can include the second server-side generation timestamp 166 and the second client-side generation timestamp 164, and an Nth video frame 140 can include the Nth server-side generation timestamp 176 and the Nth client-side generation timestamp 174. Thus, the first video frame 140 can include video that accompanies audio associated with the first audio frame 150, the second video frame 140 can include video that accompanies audio associated with the second audio frame 160, and the Nth video frame 140 can include video that accompanies audio associated with the Nth audio frame 170.

The transmitter 106 is configured to transmit the audio frames 150, 160, 170 in the audio stream transmission 404 to the client device 200 to enable the client device 200 to playout the audio frames 150, 160, 170 based on the client-side generation timestamps 154, 164, 174. For example, the client device 200 can playout the audio frames 150, 160, 170 based on the generation timestamps 154, 164, 174 in a client-clock domain. The transmitter 106 is also configured to transmit the video frames 140 to the client device 200 in a video stream transmission, such as a video stream transmission 406 as depicted in FIG. 4, which can be separate from the audio stream transmission 404. For example, when network conditions hamper video transmission, the server 100 can transmit the audio and video separately. The client device 200 can playout the video frames 140 upon receipt, and in some implementations, based on the generation timestamps 154, 164, 174 in the client-clock domain. Using the generation timestamps 154, 164, 174 to playout the audio and video frames can enable synchronized audio and video playback at the client device 200.

Transmission of the video stream transmission 406 separately from transmission of the audio stream transmission 404 enables the client device 200 to continuously playout the audio frames 150, 160, 170 in the audio stream transmission 404 during a delay associated with the video stream transmission 406. For example, if some video frames 140 are dropped or otherwise unavailable at the client device 200, the client device 200 can continuously playout the corresponding audio frames 150, 160, 170 so that audio is uninterrupted. When video frames 140 become available at the client device 200, playout of the video and audio is implicitly synchronized: the playback of the audio stream 404 is synchronized to audio source/generation (on account of using the client-side generation timestamps 154, 164, 174), the video stream 406 is played back without buffering and hence synchronized to the video source, and the audio and video sources are themselves synchronized relative to each other at the server, i.e., generated together.

Although the audio frames 150, 160, 170 are depicted to include the client-side generation timestamps 154, 164, 174 and the server-side generation timestamps 156, 166, 176, in some implementations, the client-side generation timestamps 154, 164, 174 are not included in the audio frames 150, 160, 170. In other implementations, the server-side generation timestamps 156, 166, 176 are not included in the audio frames 150, 160, 170.

FIG. 2 is a diagram of an example of the client device 200 that is operable to adjust a playback rate. The client device 200 includes one or more processors that are illustrated as a processor 202. The processor 202 is coupled to a receiver 204, a transmitter 206, a memory 208, an audio player 240, and a video player 242. The memory 208 is a non-transitory computer-readable medium that includes instructions 210. The instructions 210 are executable by the processor 202 to perform the techniques described herein.

The receiver 204 is configured to receive the plurality of audio frames 150, 160, 170 from the server 100. For example, the receiver 204 can receive the first audio frame 150, the second audio frame 160, and the Nth audio frame 170. Each audio frame 150, 160, 170 includes the corresponding server-side generation timestamp 156, 166, 176 indicating a generation time of the corresponding audio frame 150, 160, 170 in a server-clock domain. Each audio frame 150, 160, 170 also includes the corresponding client-side generation timestamp 154, 164, 174 indicating the generation time of the corresponding audio frame 150, 160, 170 in the client-clock domain. It should also be noted that although the client-side generation timestamps 154, 164, 174 for the audio frames 150, 160, 170 are described as determined by the server 100 and included in the audio frames 150, 160, 170, in some scenarios, the operations described herein with respect to the client device 200 can be performed without having the client-side generation timestamps 154, 164, 174 in the audio frames 150, 160, 170.

The processor 202 includes a clock 220, a jitter buffer manager 222, a sampling frequency determination unit 226, a playback rate adjuster 228, and a jitter buffer 230. The clock 220 of the processor 202 operates at the client clock rate 232. As a non-limiting example, the client device 200 may playback samples at 48 kHz in its native clock rate 232. However, in the server clock rate, this may correspond to an audio sampling frequency of 47 kHz. Although the 47 kHz audio sampling frequency of the client device 200 (as viewed from the server's clock rate) is merely a non-limiting example, unless otherwise noted and for ease of description, the audio sampling frequency of the client device 200 (as viewed in the server's clock rate) is described herein as 47 kHz.

The jitter buffer 230 is configured to store each of the received audio frames until a playout time of that audio frame. For example, the jitter buffer 230 is illustrated as including the audio frames 150, 160, and 170. The jitter buffer 230 also includes a client-side receive timestamp for each received audio frame that indicates a time of reception (based on the clock 220 of the client device 200) of that audio frame. For example, the client-side receive timestamps may be generated by the receiver 204 and indicate a time that each audio frame is received at the receiver or may be generated by the processor 202 and may indicate when each audio frame is received at the processor 202 or is received at the jitter buffer 230, as illustrative, non-limiting examples. As illustrated, a first client-side receive timestamp 258 indicates a reception time of the first audio frame 150, a second client-side receive timestamp 268 indicates a reception time of the second audio frame 160, and an Nth client-side receive timestamp 278 indicates a reception time of the Nth audio frame 170.

In some implementations, the processor 202 is configured to determine a sampling frequency 234 based on the server-side generation timestamps 156, 166, 176 and the client-side receive timestamps 258, 268, and 278. For example, in implementations in which the server-side generation timestamps 156, 166, 176 indicate an audio sample number or sample count, the sampling frequency determination unit 226 can track a number of samples received per unit time as an estimate of the sampling frequency 234 (in the client's clock), such as based on the difference in sample numbers between the Nth audio frame 170 and the first audio frame 150, divided by the difference in receive times as indicated by the Nth client-side receive timestamp 278 and the first client-side receive timestamp 258. In some scenarios, the sampling frequency determination unit 226 performs a least squares estimation based on the server-side generation timestamps 156, 166, 176 and the client-side receive timestamps 258, 268, and 278 to determine the sampling frequency 234.

Additionally, or in the alternative, in some implementations the processor 202 is configured to determine the sampling frequency 234 based on the client-side generation timestamps 154, 164, 174. For example, in implementations in which the client-side generation timestamps 154, 164, 174 indicate an audio sample number or sample count, the sampling frequency determination unit 226 can track a number of samples received per unit time as an estimate of the sampling frequency 234 (in the client's clock), such as based on the difference in sample numbers between the Nth audio frame 170 and the first audio frame 150, divided by the difference in receive times as indicated by the Nth client-side receive timestamp 278 and the first client-side receive timestamp 258. In some scenarios, the sampling frequency determination unit 226 performs a least squares estimation based on the client-side generation timestamps 154, 164, 174 and the client-side receive timestamps 258, 268, and 278 to determine the sampling frequency 234.

In response to determining the sampling frequency 234 (either based on the server-side generation timestamps 156, 166, 176 or the client-side generation timestamps 154, 164, 174 of the received audio frames 150, 160, 170), the processor 202 can adjust a playback rate 236 at the client device 200 to match the sampling frequency 234. For example, the playback rate adjuster 228 is configured to adjust the playback rate 236 to match the sampling frequency 234. In the scenario described above, the playback rate adjuster 228 can increase the playback rate 236 such that it matches the sampling frequency 234 (e.g., the sampling frequency 234 may be determined to be approximately 49 kHz in the client clock rate, corresponding to the sampling rate of 48 kHz in the server clock rate, and in response the client 200 can increase the playback rate 236 from a nominal rate of 48 kHz (in the client clock rate) to approximately 49 kHz (in the client clock rate)). In response to increasing the playback rate 236, the audio player 240 can playout the audio frames 150, 160, 170 at the increased playback rate 236.

However, prior to adjusting the playback rate 236 to match the sampling frequency 234, the difference between the initial playback rate 236 (e.g., 47 kHz in the server clock rate) and the sampling frequency 234 (e.g., 48 kHz in the sever clock rate) may result in a relatively high latency at the jitter buffer 230. For example, there may be a relatively large number of audio frames in queue at the jitter buffer 230 due to the difference between the initial playback rate 236 (e.g., 47 kHz) and the sampling frequency 234 (e.g., 48 kHz). To reduce the latency without noticeable changes to the audio as played out by the audio player 240, the playback rate adjuster 228 can temporarily increase the playback rate 236 by a relatively small amount to "drain" the jitter buffer 230.

To drain the jitter buffer 230, the jitter buffer manager 222 can determine an average buffer occupancy 290. The average buffer occupancy 290 indicates an average number of audio frames stored at the jitter buffer 230 of the client device 200 over a particular time span. As a non-limiting example, the average buffer occupancy 290 can indicate the average number of audio frames stored at the jitter buffer 230 over the last fifty (50) audio frames. Thus, the jitter buffer manager 222 can analyze a window to determine the average buffer occupancy 290. The jitter buffer manager 222 is configured to compare the average buffer occupancy 290 to a target buffer occupancy 292.

In response to determining that the average buffer occupancy 290 is greater than the target buffer occupancy, the jitter buffer manager 222 can send a command to the playback rate adjuster 228 to increase the playback rate 236 at the client device 200. For example the playback rate adjuster 228 can increase the playback rate 236 to reduce the average buffer occupancy 290 (e.g., to "drain" the jitter buffer 230) to the target buffer occupancy 292 during a fixed time duration ($T_{drain}$). To illustrate, the playback rate adjuster 228 can increase the playback rate 236 from 47 kHz to 48.1 kHz to reduce latency at the jitter buffer 230. According to one implementation, the fixed time duration ($T_{drain}$) can be relatively long (e.g., greater than one (1) second) such that the playback rate 236 does not result in the audio that is played out having a noticeably increased pitch.

The number of samples (e.g., audio frames) to be played back during the fixed time duration ($T_{drain}$) is equal to $(T_{drain})(f_{estimate})(B-I)K$, where $f_{estimate}$ is equal to the initial playback rate 236 (e.g., 47 kHz), B is equal to the average buffer occupancy, and K is equal to the target buffer occupancy. The new playback rate ($f'_{estimate}$) is equal to $$f_{estimate} + \frac{(B-I)K}{T_{drain}}.$$

Figure 3:
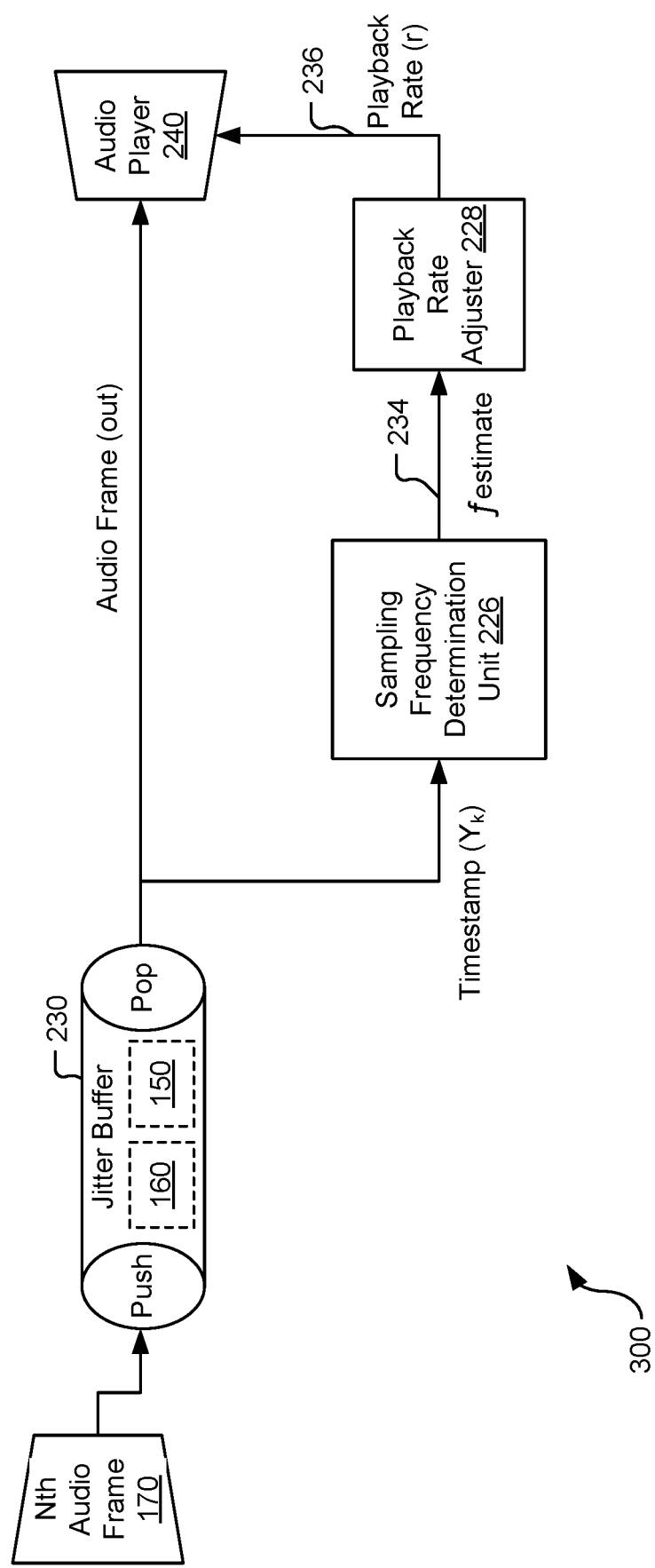
FIG. 3 is a diagram of an example of a circuit that is operable to adjust a playback rate at the client device.

FIG. 3 is a diagram of an example of a circuit 300 that is operable to adjust the playback rate 236 at the client device 200. The circuit 300 includes the jitter buffer 230, the sampling frequency determination unit 226, the playback rate adjuster 228, and the audio player 240. The circuit 300 can be integrated into the client device 200 of FIG. 2.

The jitter buffer 230 is configured to receive and store the audio frames 150, 160, 170. In the illustrative example of FIG. 3, the first audio frame 150 and the second audio frame 160 are stored in the jitter buffer 230, and the jitter buffer 230 is to receive the Nth audio frame 170. The first audio frame 150 is configured to "pop" out of the jitter buffer 230 to be played out by the audio player 240 when a playout time for the first audio frame 150 is reached. The Nth audio frame 170 can be "pushed" in the jitter buffer 230 in a last-in-last-out (LILO) configuration.

The first client-side generation timestamp ($y_k$) 154 of the first audio frame 150 is provided to the sampling frequency determination unit 226 when the first audio frame 150 is provided to the audio player 240. As additional client-side generation timestamps 164, 174 are provided to the sampling frequency determination unit 226 when the corresponding audio frames 160, 170 are provided to the audio player 240, the sampling frequency determination unit 226 is configured to determine the sampling frequency ($f_{estimate}$) 234 in a similar manner as described with respect to FIG. 2. Thus, the sampling frequency ($f_{estimate}$) 234 is continuously updated.

The playback rate adjuster 228 is configured to adjust the playback rate (r) 236 to match the sampling frequency ($f_{estimate}$) 234. The playback rate 236 is provided to the audio player 240, and the audio player 240 plays out the audio frames 150, 160, 170 based on the playback rate 236. In some implementations, the playback rate 236 is an indication of the playout rate. In other implementations, the playback rate 236 corresponds to a rate factor (e.g., from one-half (½) to two (2)) that is used as a multiplicative adjustment to the playout rate of the audio player 240.

FIG. 4 is a diagram of an example of a system 400 that includes the server 100 and the client device 200. As depicted in FIG. 4, the client device 200 includes a head mounted device (e.g., a virtual reality device, a mixed reality device, or an augmented reality device) that is placed over a head of a user 450. The client device 200 sends the information 402 (e.g., the head pose samples) to the server 100 to enable the server 100 to determine the synchronization parameters 134, as described above.

In FIG. 4, additional client devices 200A, 200B are also illustrated. For example, a client device 200A can be a vest that is worn by the user 450 while the user 450 participates in a virtual environment generated by the server 100. In a similar manner as described with respect to the information 402, the client device 200A can also periodically send information (e.g., body position information) to the server 100 to enable the server 100 to determine the synchronization parameters 134. As another example, a client device 200B can be a hand-held that is used by the user 450 while the user 450 participates in the virtual environment generated by the server 100. In a similar manner as described with respect to the information 402, the client device 200B can also periodically send information (e.g., position information or activity information) to the server 100 to enable the server 100 to determine the synchronization parameters 134.

The server 100 generates the audio frames 150, 160, 170 in a similar manner as described with respect to FIG. 1. After generating the audio frames 150, 160, 170, the server 100 transmits the audio frames 150, 160, 170 to the client device 200 as part of the audio stream transmission 404. The server 100 also generates the video frames 140 in a similar manner as described with respect to FIG. 1. After generating the video frames 140, the server 100 transmits the video frames 140 to the client device 200 as part of the video stream transmission 406 that can be separate from audio stream transmission 404.

Transmission of the video stream transmission 406 separately from transmission of the audio stream transmission 404 enables the client device 200 to continuously playout the audio frames 150, 160, 170 in the audio stream transmission 404 during a delay associated with the video stream transmission 406. For example, if some video frames 140 are dropped or otherwise unavailable at the client device 200, the client device 200 can continuously playout the corresponding audio frames 150, 160, 170 so that audio is uninterrupted. When video frames 140 become available at the client device 200, playout of the video and audio is implicitly synchronized: the playback of the audio stream 404 is synchronized to audio source/generation (on account of using the client-side generation timestamps 154, 164, 174), the video stream 406 is played back without buffering and hence synchronized to the video source, and the audio and video sources are themselves synchronized relative to each other at the server 100, i.e., generated together.

Figure 5A:
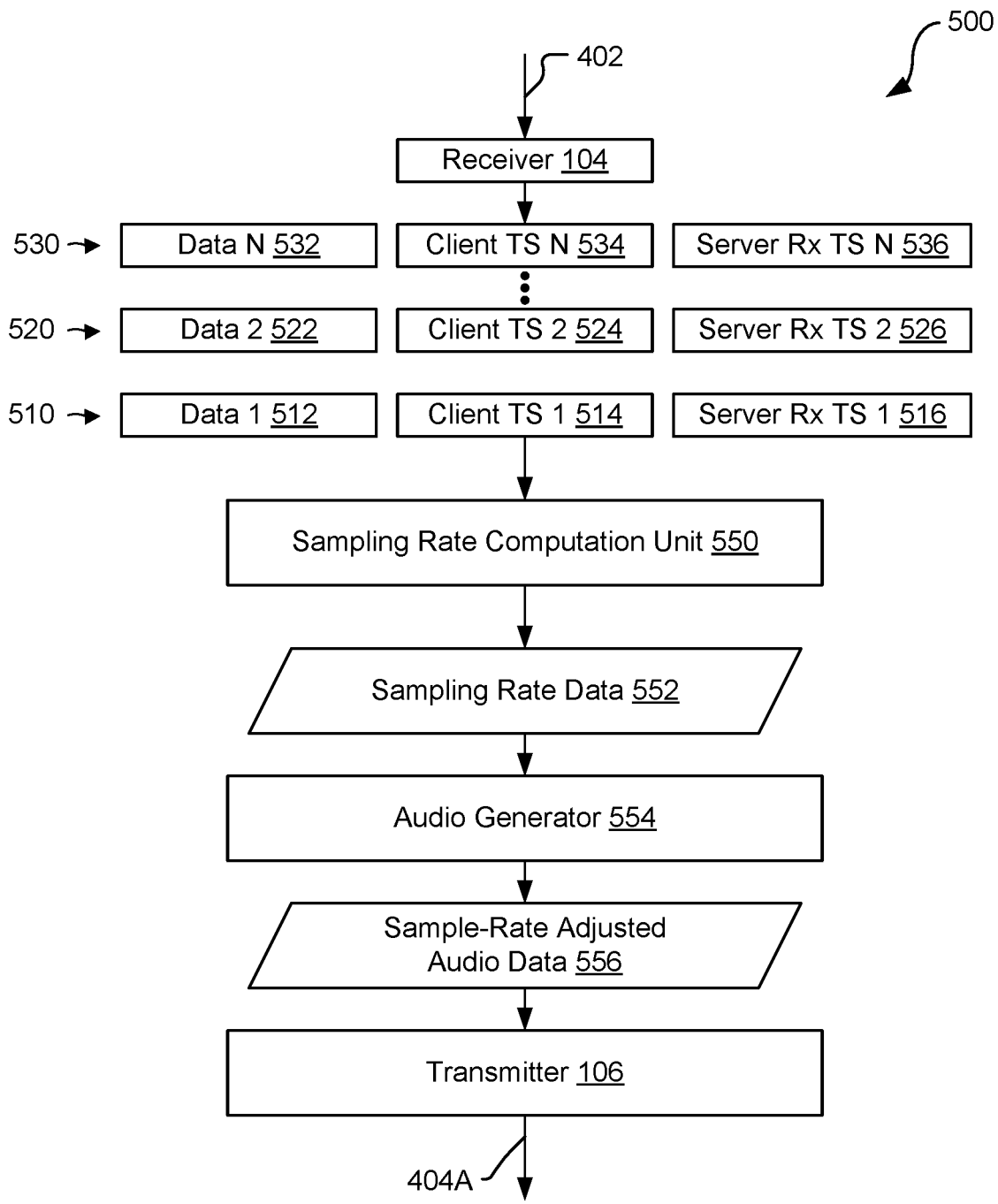
FIG. 5A is a diagram of an example of a system that is operable to adjust a server-side audio frame generation rate based on a client-side playback rate.

FIG. 5A illustrates an example of a system 500 that is operable to adjust a server-side audio frame generation rate based on a client-side playback rate. The system 500 can be integrated into the server 100 of FIG. 1. The system 500 includes the receiver 104, a sampling rate computation unit 550, an audio generator 554, and the transmitter 106.

The receiver 104 is configured to receive the information 402 from the client device 200. As a non-limiting example, the receiver 104 receives the head pose samples 510, 520, 530 from the client device 200. The information 402 includes data that is indicative of a head pose of the user 450 and a client-side timestamp indicating when the corresponding data was generated at the client device 200. For example, a first head pose sample 510 (included in the information 402) includes data 512 that indicates a head pose of the user 450 at a first time and a client-side timestamp 514 that indicates when the data 512 was generated at the client device 200. A second head pose sample 520 (included in the information 402) includes data 522 that indicates a head pose of the user 450 at a second time and a client-side timestamp 524 that indicates when the data 522 was generated at the client device 200. A third head pose sample 530 (included in the information 402) includes data 532 that indicates a head pose of the user 450 at a third time and a client-side timestamp 534 that indicates when the data 532 was generated at the client device 200.

The processor 102 is configured to record (or generate) server-side timestamps 516, 526, 536 that indicate when the corresponding head pose samples 510, 520, 530 are received at the server 100. For example, the processor 102 can record a first server-side timestamp 516 that indicates when the first head pose sample 510 is received at the server 100, a second server-side timestamp 526 that indicates when the second head pose sample 520 is received at the server 100, and a third server-side timestamp 536 that indicates when the third head pose sample 530 is received at the server 100.

The sampling rate computation unit 550 is configured to determine sampling rate data 552 based on the client-side timestamps 514, 524, 534 and the server-side timestamps 516, 526, 536. The sampling rate data 552 indicates a server-side sampling rate ($f_{estimate}$) of the clock 120 that corresponds to a client-side sampling rate ($f_{client}$) of the clock 220. For example, based on the client-side timestamps 514, 524, 534 collected over a past K head pose samples, the sampling rate computation unit 550 can determine the server-side sampling rate ($f_{estimate}$) that substantially matches the client-side sampling rate ($f_{client}$) of the clock 220. The sampling rate data 552 is provided to the audio generator 554.

The audio generator 554 is configured to generate sample-rate adjusted audio data 556 (e.g., the audio frames) based on the determined server-side sampling rate ($f_{estimate}$) that matches the client-side sampling rate ($f_{client}$) of the clock 220. For example, the audio generator 554 adjusts the audio frame generation rate at the server 100 such that sample-rate adjusted audio data 556 is generated at the server 100 at the substantially the same rate as the audio frames 150, 160, 170 are played out at the client device 200. As a result, underflow and overflow at the client device 200 can be substantially reduced. The transmitter 106 transmits the sample-rate adjusted audio data 556 to the client device 200 as part of an audio stream transmission 404A.

Figure 5B:
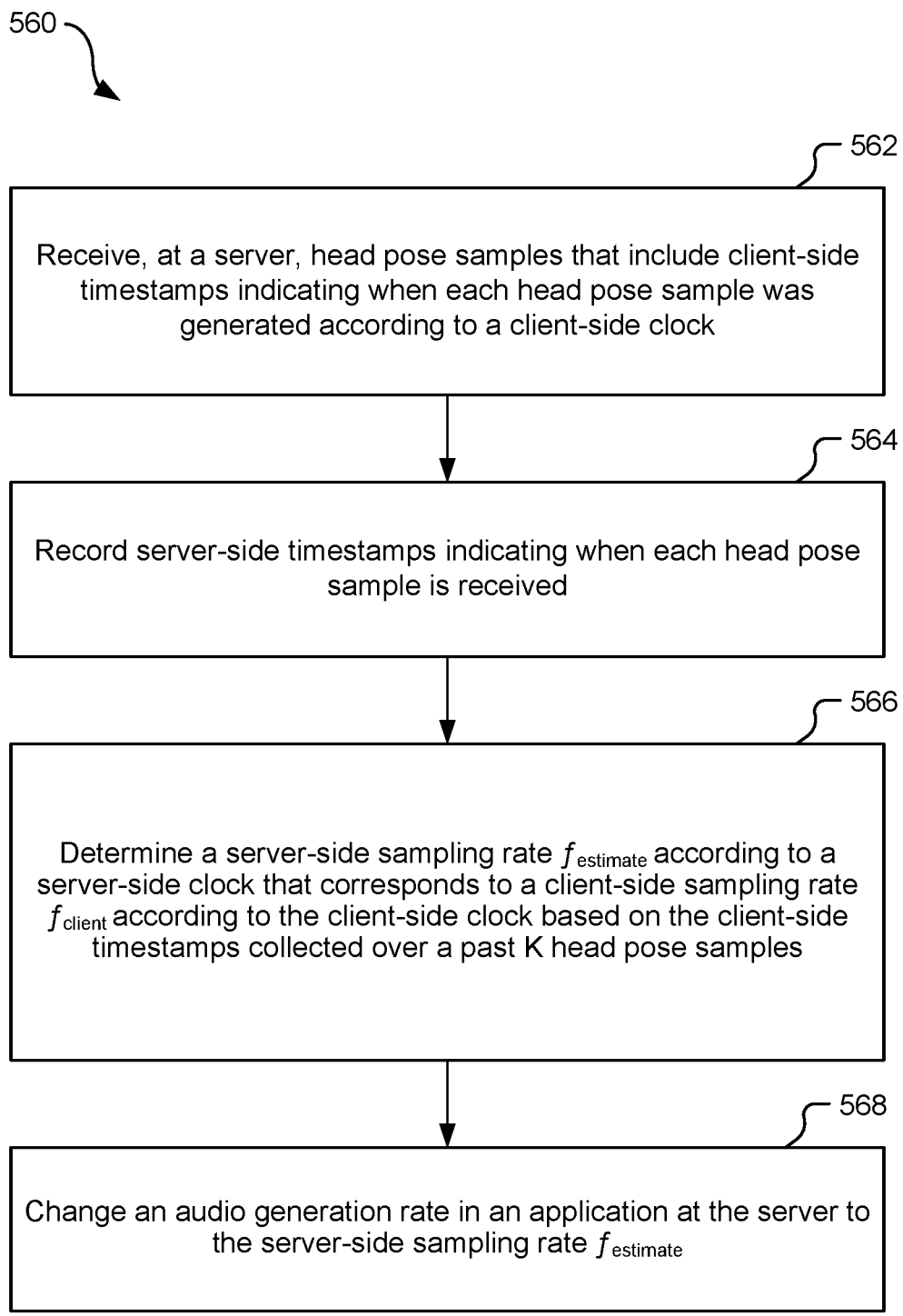
FIG. 5B illustrates a flowchart of a method of adjusting a server-side audio frame generation rate based on a client-side playback rate.

FIG. 5B illustrates a flowchart of a method 560 of adjusting a server-side audio frame generation rate based on a client-side playback rate. The method 560 can be performed by the server 100 of FIG. 1, the system 500 of FIG. 5A, or both.

The method 560 includes receiving, at a server, head pose samples that include client-side timestamps indicating when each head pose sample was generated according to a client-side clock, at 562. For example, the receiver 104 receives the head pose samples 510, 520, 530 from the client device 200. The first head pose sample 510 includes data 512 that indicates the head pose of the user 450 at the first time and the client-side timestamp 514 that indicates when the data 512 was generated at the client device 200. The second head pose sample 520 includes data 522 that indicates the head pose of the user 450 at the second time and the client-side timestamp 524 that indicates when the data 522 was generated at the client device 200. The third head pose sample 530 includes data 532 that indicates the head pose of the user 450 at the third time and the client-side timestamp 534 that indicates when the data 532 was generated at the client device 200.

The method 560 also includes recording server-side timestamps indicating when each head pose sample is received, at 564. For example, the processor 102 records the server-side timestamps 516, 526, 536 that indicate when the corresponding head pose samples 510, 520, 530 are received at the server 100. The method 560 also includes determining a server-side sampling rate ($f_{estimate}$) according to a server-side clock that corresponds to a client-side sampling rate ($f_{client}$) according to the client-side clock based on the client-side timestamps collected over a past K head pose samples, at 566. For example, the sampling rate computation unit 550 determines the sampling rate data 552 based on the client-side timestamps 514, 524, 534 and the server-side timestamps 516, 526, 536. The sampling rate data 552 indicates the server-side sampling rate ($f_{estimate}$) of the clock 120 that corresponds to the client-side sampling rate ($f_{client}$) of the clock 220. For example, based on the client-side timestamps 514, 524, 534 collected over a past K head pose samples, the sampling rate computation unit 550 can determine the server-side sampling rate ($f_{estimate}$) that substantially matches the client-side sampling rate ($f_{client}$) of the clock 220.

The method 560 also includes changing an audio generation rate in an application at the server to the server-side sampling rate ($f_{estimate}$), at 568. For example, the audio generator 554 generates the sample-rate adjusted audio data 556 (e.g., the audio frames) based on the determined server-side sampling rate ($f_{estimate}$) that matches the client-side sampling rate ($f_{client}$) of the clock 220. The audio generator 554 adjusts the audio frame generation rate at the server 100 such that sample-rate adjusted audio data is generated at the server 100 at the substantially the same rate as the audio frames 150, 160, 170 are played out at the client device 200. As a result, underflow and overflow at the client device 200 can be substantially reduced.

Figure 6A:
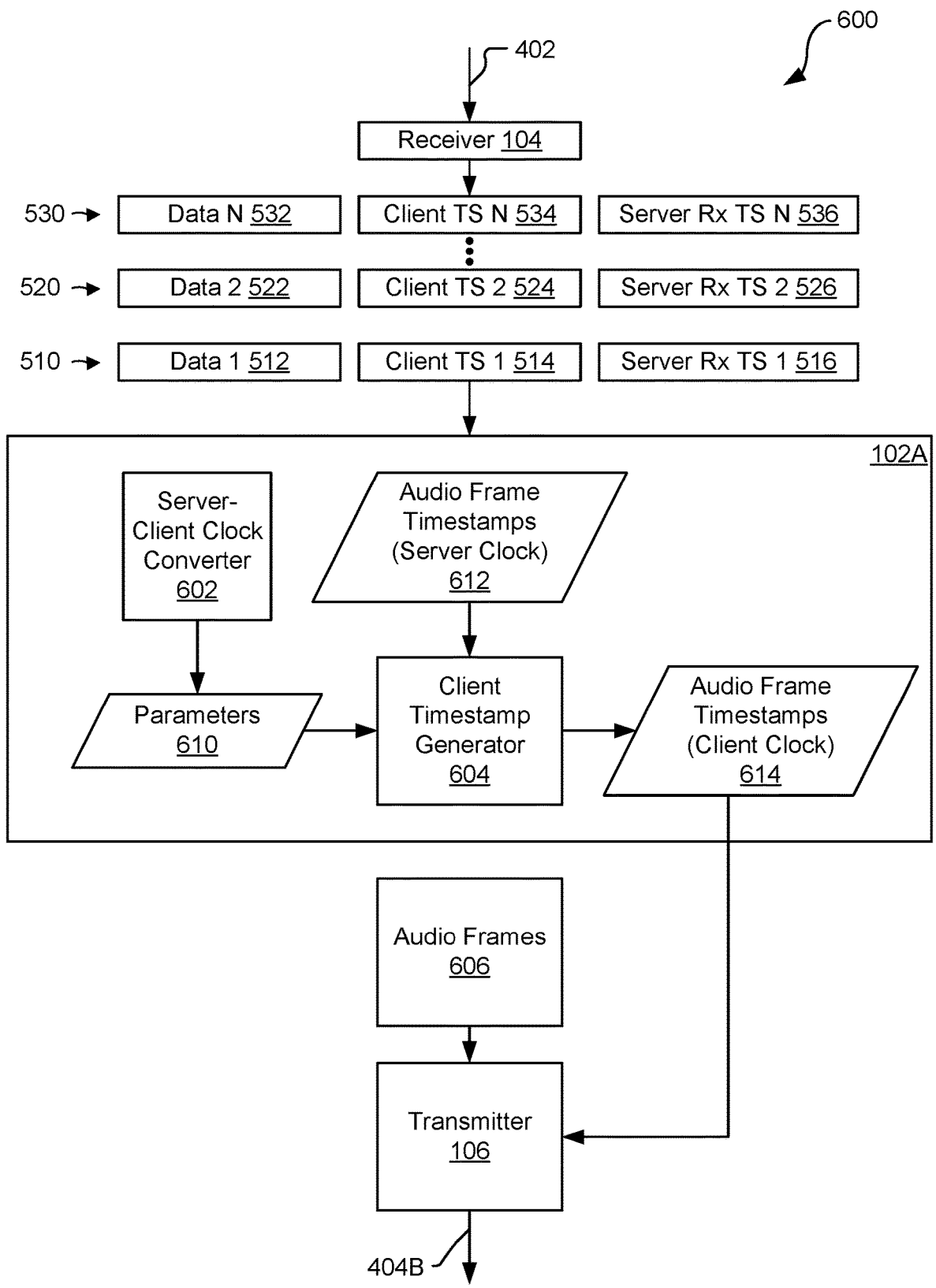
FIG. 6A illustrates an example of a system that is operable to convert server-side timestamps to a client-clock timestamps.

FIG. 6A illustrates an example of a system 600 that is operable to convert server-side timestamps to client-clock timestamps. The system 600 can be integrated into the server 100 of FIG. 1. The system 600 includes the receiver 104, a processor 102A, and the transmitter 106. The processor 102A includes a server-client clock converter 602 and a client timestamp generator 604, which can correspond to the client timestamp generator 126.

The receiver 104 is configured to receive the information 402 from the client device 200. As a non-limiting example, the receiver 104 receives the head pose samples 510, 520, 530 from the client device 200. As described above, the head pose samples 510, 520, 530 include the corresponding data 512, 522, 532 and the corresponding client-side timestamps 514, 524, 534. The processor 102A is configured to record (or generate) the server-side timestamps 516, 526, 536 that indicate when the corresponding head pose samples 510, 520, 530 are received at the server 100. For example, the processor 102A can record the first server-side timestamp 516 that indicates when the first head pose sample 510 is received at the server 100, the second server-side timestamp 526 that indicates when the second head pose sample 520 is received at the server 100, and the third server-side timestamp 536 that indicates when the third head pose sample 530 is received at the server 100.

The server-client clock converter 602 is configured to determine parameters 610 (e.g., the synchronization parameters 134) to convert server-side timestamps to client-side timestamps based on the client-side timestamps 514, 524, 534 collected using a past K number of packets. The processor 102A is configured to generate audio frames 606 that have audio frame timestamps 612. Each audio frame timestamp 612 indicates a generation time (in the server-clock domain) of the corresponding audio frame 606. The client timestamp generator 604 is configured to associate each audio frame 606 produced at an application at the server 100 with an audio frame timestamp 614 (in the client-clock domain) based on the parameters 610 and the corresponding audio frame timestamp 612. The processor 102A can packetize the audio frames 606 and the corresponding audio frame timestamps 614, and the transmitter 106 can send the packetized audio frames 606 and audio frame timestamps 614 to the client device 200 as an audio stream transmission 404B.

Figure 6B:
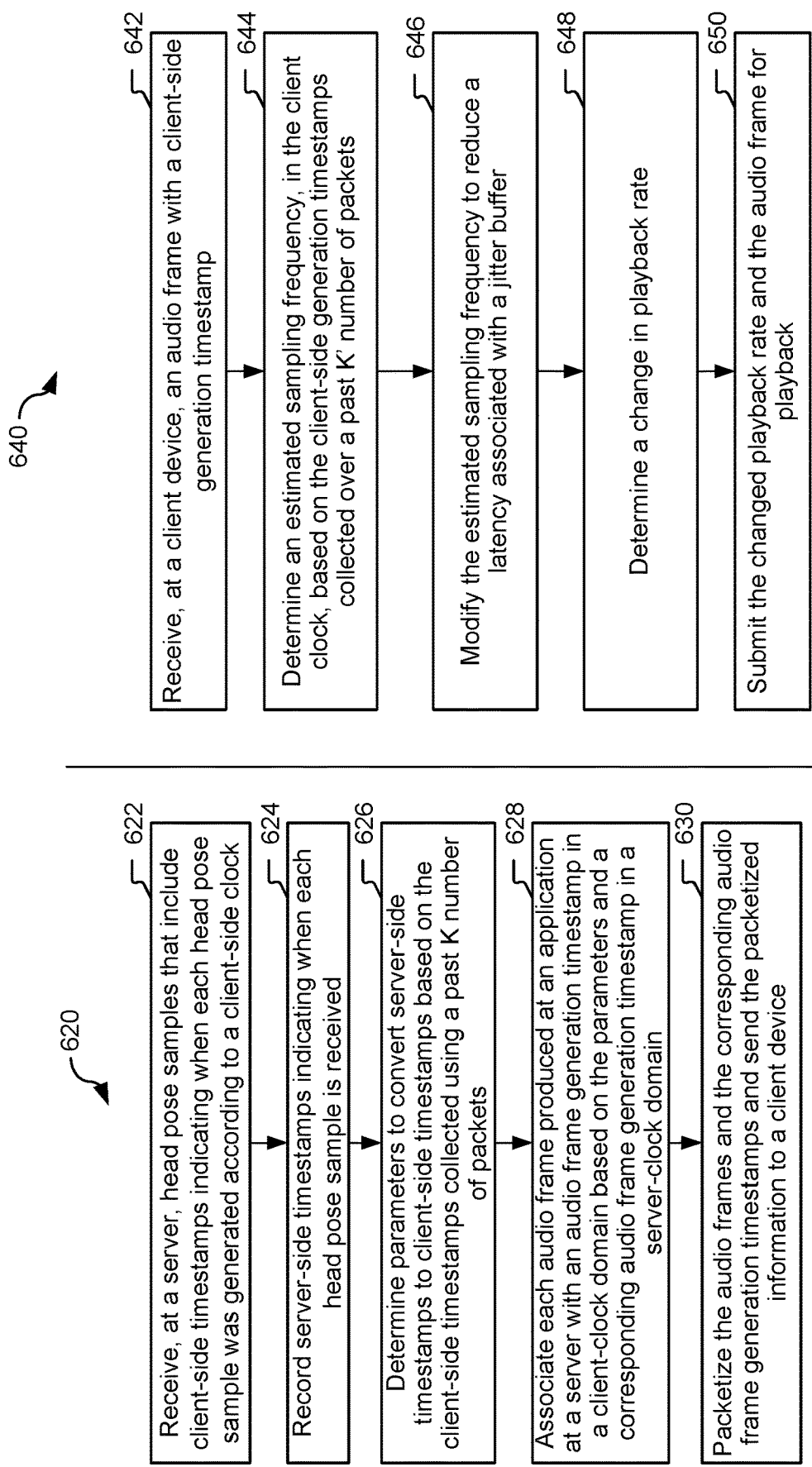
FIG. 6B illustrates flowcharts of methods according to techniques described herein.

FIG. 6B illustrates flowcharts of methods 620, 640 according to the techniques described herein. The first method 620 can be performed by the server 100, the system 600, or both. The second method 640 can be performed by the client device 200.

The first method 620 includes receiving, at a server, head pose samples that include client-side timestamps indicating when each head pose sample was generated according to a client-side clock, at 622. For example, the receiver 104 receives the head pose samples 510, 520, 530 from the client device 200. The first head pose sample 510 includes data 512 that indicates the head pose of the user 450 at the first time and the client-side timestamp 514 that indicates when the data 512 was generated at the client device 200. The second head pose sample 520 includes data 522 that indicates the head pose of the user 450 at the second time and the client-side timestamp 524 that indicates when the data 522 was generated at the client device 200. The third head pose sample 530 includes data 532 that indicates the head pose of the user 450 at the third time and the client-side timestamp 534 that indicates when the data 532 was generated at the client device 200.

The first method 620 includes recording server-side timestamps indicating when each head pose sample is received, at 624. For example, the processor 102A records the server-side timestamps 516, 526, 536 that indicate when the corresponding head pose samples 510, 520, 530 are received at the server 100. The first method 620 also includes determining parameters to convert server-side timestamps to client-side timestamps based on the client-side timestamps collected using a past K number of packets (where K is an integer greater than 1), at 626. For example, the server-client clock converter 602 determines the parameters 610 to convert server-side timestamps to client-side timestamps based on the client-side timestamps 514, 524, 534 collected using a past K number of packets.

The first method 620 also includes associating each audio frame produced at an application at a server with an audio frame generation timestamp in a client-clock domain (e.g., a client-side generation timestamp) based on the parameters and a corresponding audio frame generation timestamp in a server-clock domain (e.g., a server-side generation timestamp), at 628. For example, the client timestamp generator 604 is configured to associate each audio frame 606 produced at an application at the server 100 with an audio frame timestamp 614 (in the client-clock domain) based on the parameters 610 and the corresponding audio frame timestamp 612. The first method 620 also includes packetizing the audio frames and the corresponding audio frame client-side generation timestamps and sending the packetized information to a client device, at 630. For example, the processor 102A packetizes the audio frames 606 and the corresponding audio frame timestamps 614, and the transmitter 106 sends the packetized audio frames 606 and audio frame timestamps 614 to the client device 200 as an audio stream transmission 404B.

The second method 640 includes receiving, at a client device, an audio frame with a client-side generation timestamp, at 642. For example, the receiver 204 of the client device 200 receives the first audio frame 150 having the first client-side generation timestamp 154, the second audio frame 160 having the second client-side generation timestamp 164, and the Nth audio frame 170 having the Nth client-side generation timestamp 174.

The second method 640 also includes determining an estimated sampling frequency, in the client clock domain, based on the client-side generation timestamps collected over a past K' number of packets (where K' is an integer greater than 1 that may equal K or may differ from K), at 644. For example, the sampling frequency determination unit 226 can determine the estimated sampling frequency 234 based on the client-side generation timestamps 154, 164, 174. The second method 640 also includes modifying the estimated sampling frequency to reduce a latency associated with a jitter buffer, at 648. For example, the processor 202 can modify the estimated sampling frequency to reduce a latency associated with the jitter buffer 230. The second method 640 also includes determining a change in playback rate, at 648. For example, the playback rate adjuster 228 can change the playback rate to reduce the latency associated with the jitter buffer 230. To illustrate, the change in the playback rate may be determined based on the estimated sampling frequency and a nominal sampling frequency. The second method 640 also includes submitting the changed playback rate and the audio frame for playback, at 650. For example, the processor 202 can submit the changed playback rate and the audio frame to the audio player 240 for playback.

Figure 7:
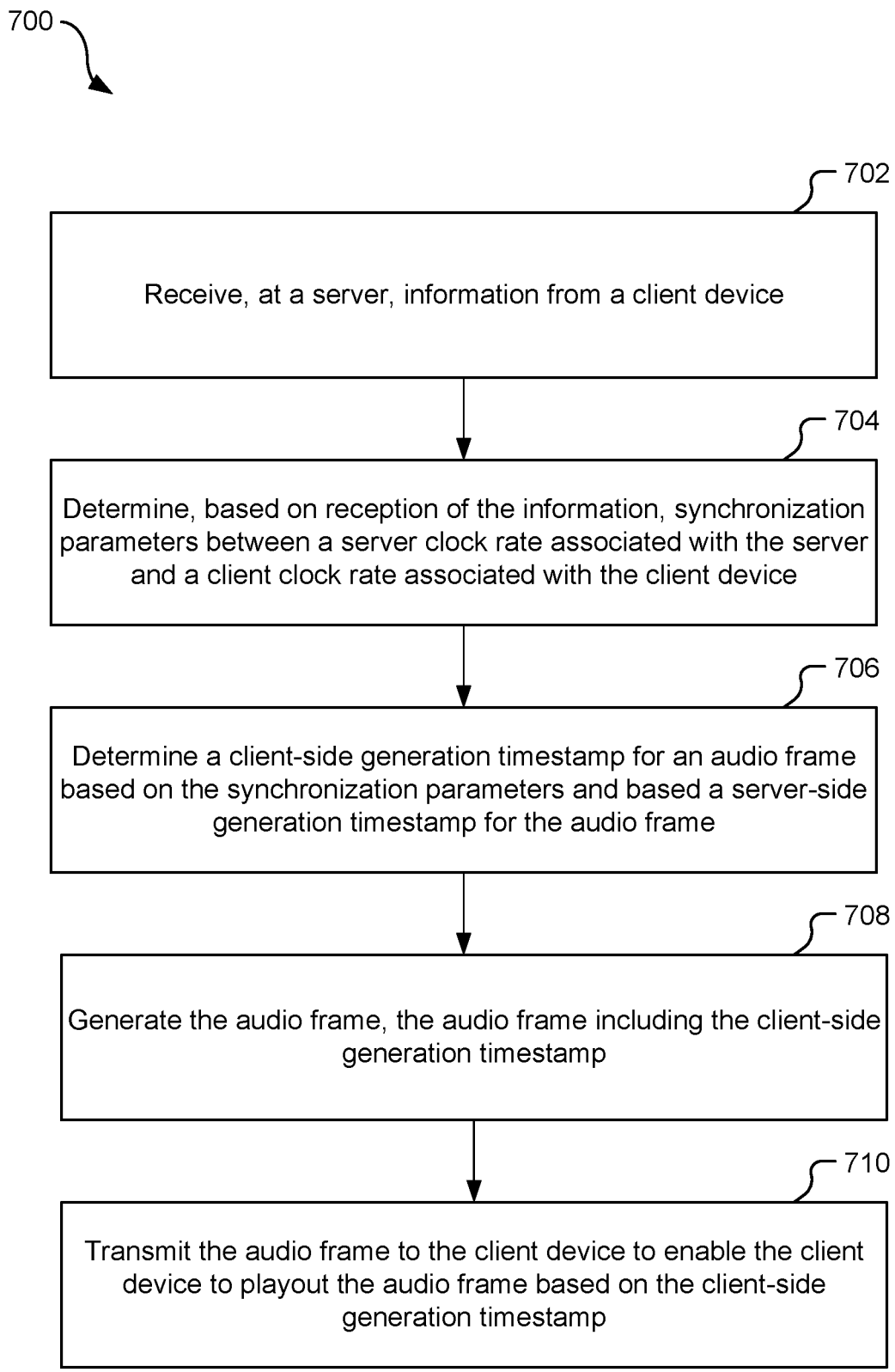
FIG. 7 illustrates a flowchart of a particular implementation of a method of generating timing information for a client device.

FIG. 7 illustrates a flowchart of a particular implementation of a method 700 of generating timing information for a client device. The method 700 can be performed by the server 100 of FIG. 1 or the system 600 of FIG. 6A. For example, FIG. 7 can correspond to acts performed by a server to generate client-side generation timestamps, and FIG. 8 can correspond to acts performed by a client device to use the client-side generation timestamps to adjust a playback rate, in a manner similar to the methods 620 and 640 of FIG. 6B.

The method 700 includes receiving, at a server, information from a client device, at 702. For example, the receiver 104 receives the information 402 from the client device 200. The information 402 can include a plurality of head pose samples that are received as period as transmissions from the client device 200. Each head pose sample can be indicative of an orientation of the client device 200 at a corresponding time. For example, the receiver 104 can receive a first head pose sample at a first time, a second head pose sample at a second time, a third head pose sample at a third time, etc. The first head pose sample can indicate the orientation of the client device 200 at a time the first head pose sample was generated, the second head pose sample can indicate the orientation of the client device 200 at a time the second head pose sample was generated, the third head pose sample can indicate the orientation of the client device 200 at the time the third head pose sample was generated, etc.

The method 700 also includes determining, based on reception of the information, synchronization parameters between a server clock rate associated with the server and a client clock rate associated with the client device, at 704. For example, the synchronization parameter determination unit 122 determines, based on reception of the information 402 (e.g., the head pose samples) from the client device 200, the synchronization parameters 134 between the server clock rate 132 and the client clock rate 232. The synchronization parameters 134 can include the drift value 136 that is indicative of the drift between the server clock rate 132 and the client clock rate 232. The synchronization parameters 134 can also include the offset value 138 that is indicative of the offset between a server clock value and a client clock value. The drift value 136 and the offset value 138 can be determined and updated, by the synchronization parameter determination unit 122, using a least squares estimation over a window of the last M head pose samples received, where M is any integer number greater that two (2). As a non-limiting example, if M is equal to fifty (50), the drift value 136 and the offset value 138 can be determined and updated using a least squares estimation over a window of the last fifty (50) head pose samples received.

The method 700 also includes determining a client-side generation timestamp for an audio frame based on the synchronization parameters and a server-side generation timestamp for the audio frame, at 706. For example, the client timestamp generator 126 determines the first client-side generation timestamp 154 for the audio frame 150 based on the synchronization parameters 134 and the first server-side generation timestamp 156, the second client-side generation timestamp 164 for the audio frame 160 based on the synchronization parameters 134 and the second server-side generation timestamp 166, and the Nth client-side generation timestamp 174 for the audio frame 170 based on the synchronization parameters 134 and the Nth server-side generation timestamp 176. For example, the client-side generation timestamps ($ts_{client}$) 154, 164, 174 can be determined using the respective server-side generation timestamps ($ts_{server}$) 156, 166, 176 according to the following formula:

$$ts_{client} = (ts_{server})(\text{drift}) + \text{offset}$$

Thus, the server 100 can periodically receive a proxy for the client clock rate 232 in the form of head pose samples and can use the proxy to determine client-side generation timestamps ($ts_{client}$) 154, 164, 174 that indicate when corresponding audio frames 150, 160, 170 are generated according to a client-clock domain.

The method 700 also includes generating the audio frame, at 708. The audio frame includes the client-side generation timestamp. For example, the audio frame generation unit 130 generates the plurality of audio frames 150, 160, 170 that are to be transmitted to the client device 200 as part of the audio stream transmission 404. Each audio frame 150, 160, 170 includes the respective client-side generation timestamp ($ts_{client}$) 154, 164, 174. The method 700 also includes transmitting the audio frame to the client device to enable the client device to playout the audio frame based on the client-side generation timestamp, at 710.

Figure 8:
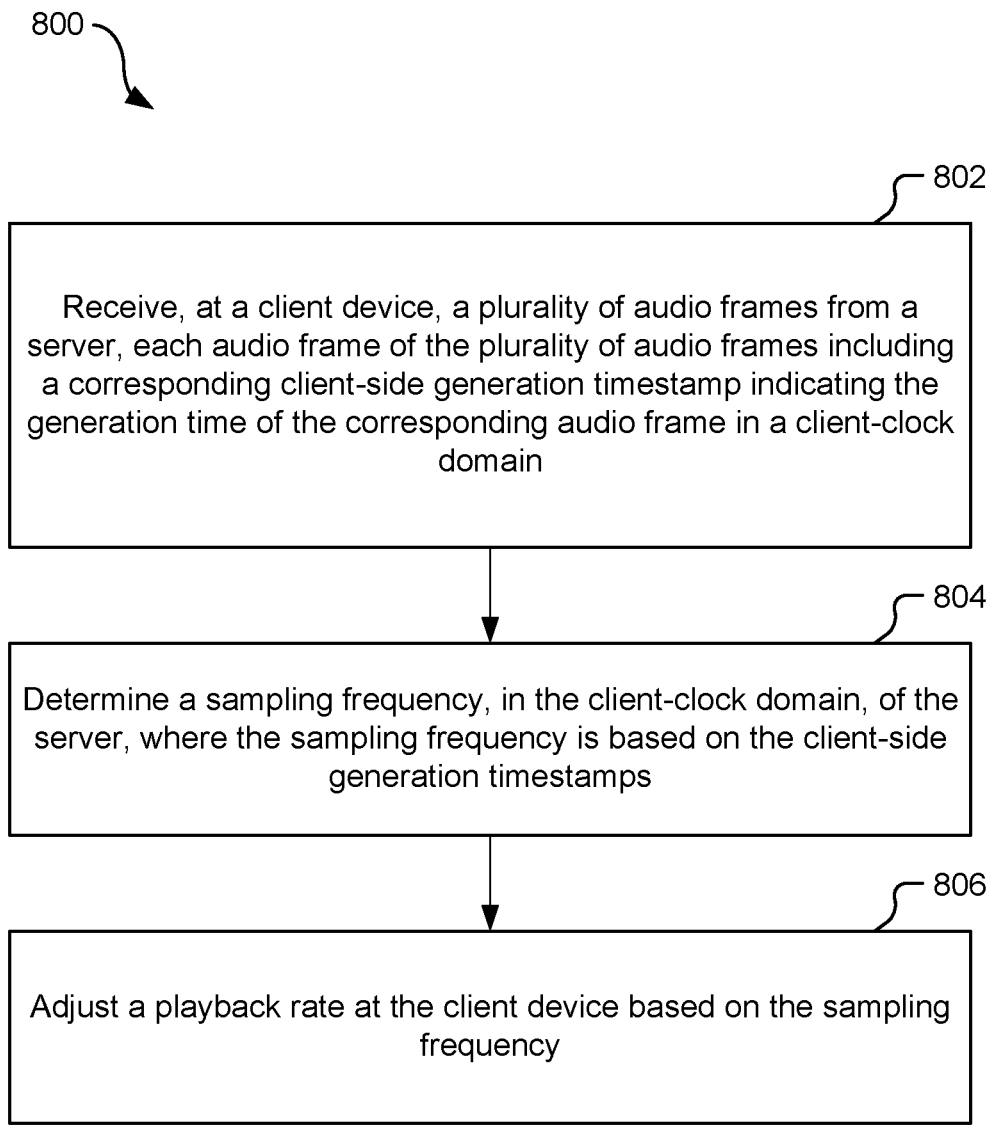
FIG. 8 illustrates a flowchart of a particular implementation of a method of adjusting a playback rate.

FIG. 8 illustrates a flowchart of another particular implementation of a method 800 of adjusting a playback rate. The method 800 can be performed by the client device 200 of FIG. 2.

The method 800 includes receiving, at a client device, a plurality of audio frames from a server, at 802. Each audio frame of the plurality of audio frames includes a corresponding client-side generation timestamp indicating the generation time of the corresponding audio frame in a client-clock domain. For example, the receiver 204 receives the plurality of audio frames 150, 160, 170 from the server 100. To illustrate, the receiver 204 can receive the first audio frame 150, the second audio frame 160, and the Nth audio frame 170. Each audio frame 150, 160, 170 includes the corresponding client-side generation timestamp 154, 164, 174 indicating the generation time of the corresponding audio frame 150, 160, 170 in the client-clock domain.

The method 800 also includes determining a sampling frequency, in the client-clock domain, of the server, where the sampling frequency is based on the client-side generation timestamps, at 804. For example, the sampling frequency determination unit 226 can determine the sampling frequency 234 in the client-clock domain based on the client-side generation timestamps 154, 164, 174.

The method 800 also includes adjusting a playback rate at the client device based on the sampling frequency, at 806. For example, the playback rate adjuster 228 adjusts the playback rate 236 based on the sampling frequency 234. To illustrate, the playback rate adjuster 228 can increase the playback rate 236 so that it matches the sampling frequency 234 (e.g., 48 kHz in the server clock rate). In response to increasing the playback rate 236, the audio player 240 can playout the audio frames 150, 160, 170 at the increased playback rate 236.

In some implementations, the method 800 can also include, prior to adjusting the playback rate based on the sampling frequency, at 808, further adjusting the playback rate to affect a latency in a jitter buffer. For example, the method 800 can include comparing an average buffer occupancy to a target buffer occupancy, where the average buffer occupancy indicating an average number of audio frames stored at the jitter buffer of the client device over a particular time span. The method 800 can include increasing the playback rate at the client device to reduce the average buffer occupancy to the target buffer occupancy during a fixed time duration. After the fixed time duration, the playback rate can be adjusted to match the sampling frequency.

Figure 9:
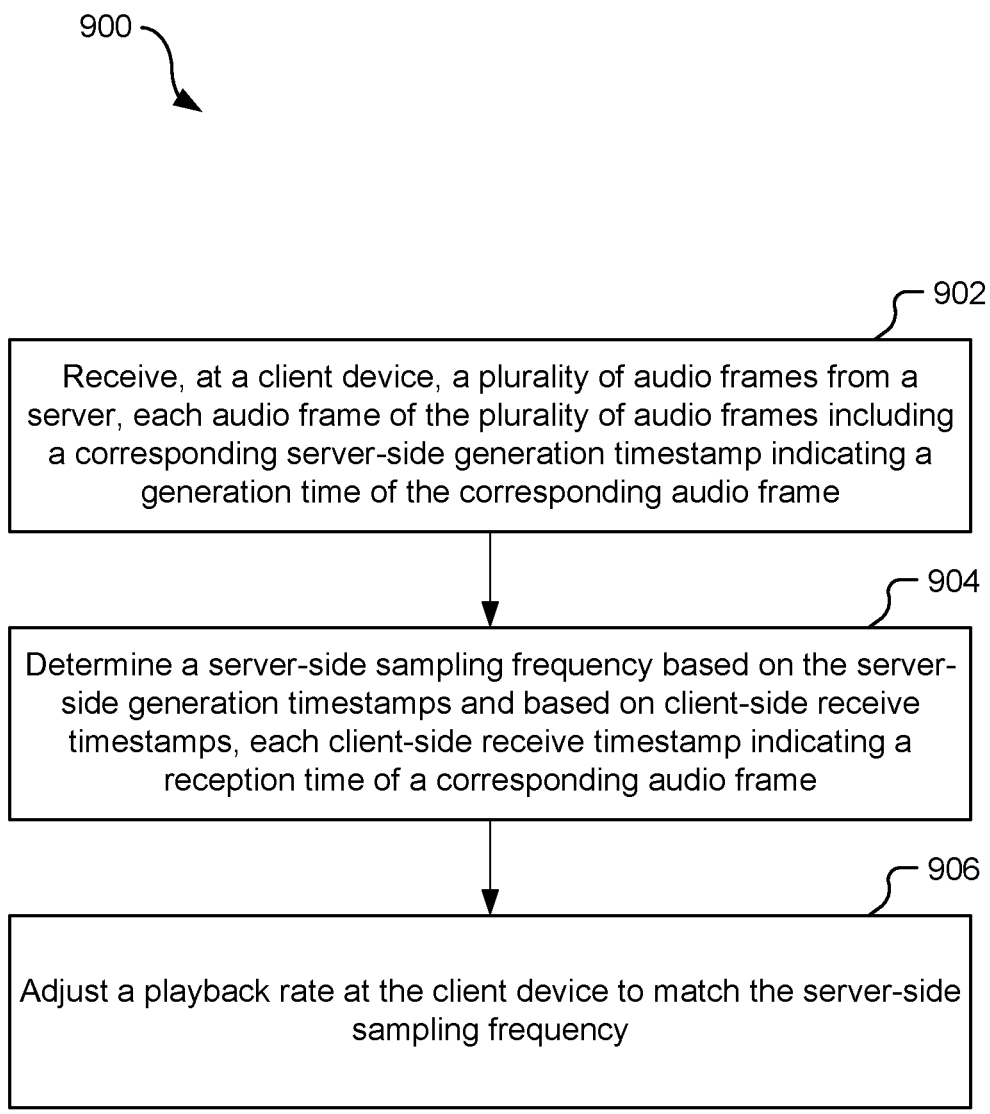
FIG. 9 illustrates a flowchart of another particular implementation of a method of adjusting a playback rate.

FIG. 9 illustrates a flowchart of a particular implementation of a method 900 of adjusting a playback rate. The method 900 can be performed by the client device 200 of FIG. 2.

The method 900 includes receiving, at a client device, a plurality of audio frames from a server, at 902. Each audio frame of the plurality of audio frames includes a corresponding server-side generation timestamp that indicates a generation time of the corresponding audio frame. To illustrate, the receiver 204 receives the first audio frame 150, the second audio frame 160, and the Nth audio frame 170. Each audio frame 150, 160, 170 includes the corresponding server-side generation timestamp 156, 166, 176 indicating the generation time of the corresponding audio frame 150, 160, 170 in the server-clock domain.

The method 900 also includes determining a sampling frequency based on the server-side generation timestamps and based on client-side receive timestamps, at 904. Each of the client-side receive timestamps indicates a reception time of a corresponding audio frame. For example, the sampling frequency determination unit 226 may perform a least squares estimation based on the server-side generation timestamps 156, 166, 176 and the client-side receive timestamps 258, 268, 278 to determine the sampling frequency 234.

The method 900 also includes adjusting a playback rate at the client device to match the sampling frequency, at 906. For example, the playback rate adjuster 228 adjusts the playback rate 236 to match the sampling frequency 234. In the scenario described herein, the playback rate adjuster 228 increases the playback rate 236 from 47 kHz to 48 kHz such that the playback rate 236 matches the sampling frequency 234 (e.g., 48 kHz). In response to increasing the playback rate 236 to 48 kHz, the audio player 240 can playout the audio frames 150, 160, 170 at the increased playback rate 236.

According to one implementation, prior to adjusting the playback rate to match the sampling frequency, the method 900 includes comparing an average buffer occupancy to a target buffer occupancy. The average buffer occupancy indicates an average number of audio frames stored at a jitter buffer of the client device over a particular time span. For example, the jitter buffer manager 222 compares the average buffer occupancy 290 to the target buffer occupancy 292. The method 900 can also include increasing the playback rate at the client device to reduce the average buffer occupancy to the target buffer occupancy during a fixed time duration. For example, in response to determining that the average buffer occupancy 290 is greater than the target buffer occupancy 292, the jitter buffer manager 222 sends a command to the playback rate adjuster 228 to increase the playback rate 236 at the client device 200. The playback rate adjuster 228 increases the playback rate 236 to reduce the average buffer occupancy 290 (e.g., to "drain" the jitter buffer 230) to the target buffer occupancy 292 during the fixed time duration ($T_{drain}$). To illustrate, the playback rate adjuster 228 can increase the playback rate 236 from 47 kHz to 48.1 kHz (in the server clock rate, or from 48 kHz to approximately 49.1 kHz in the client clock rate) to reduce latency at the jitter buffer 230.

Figure 10:
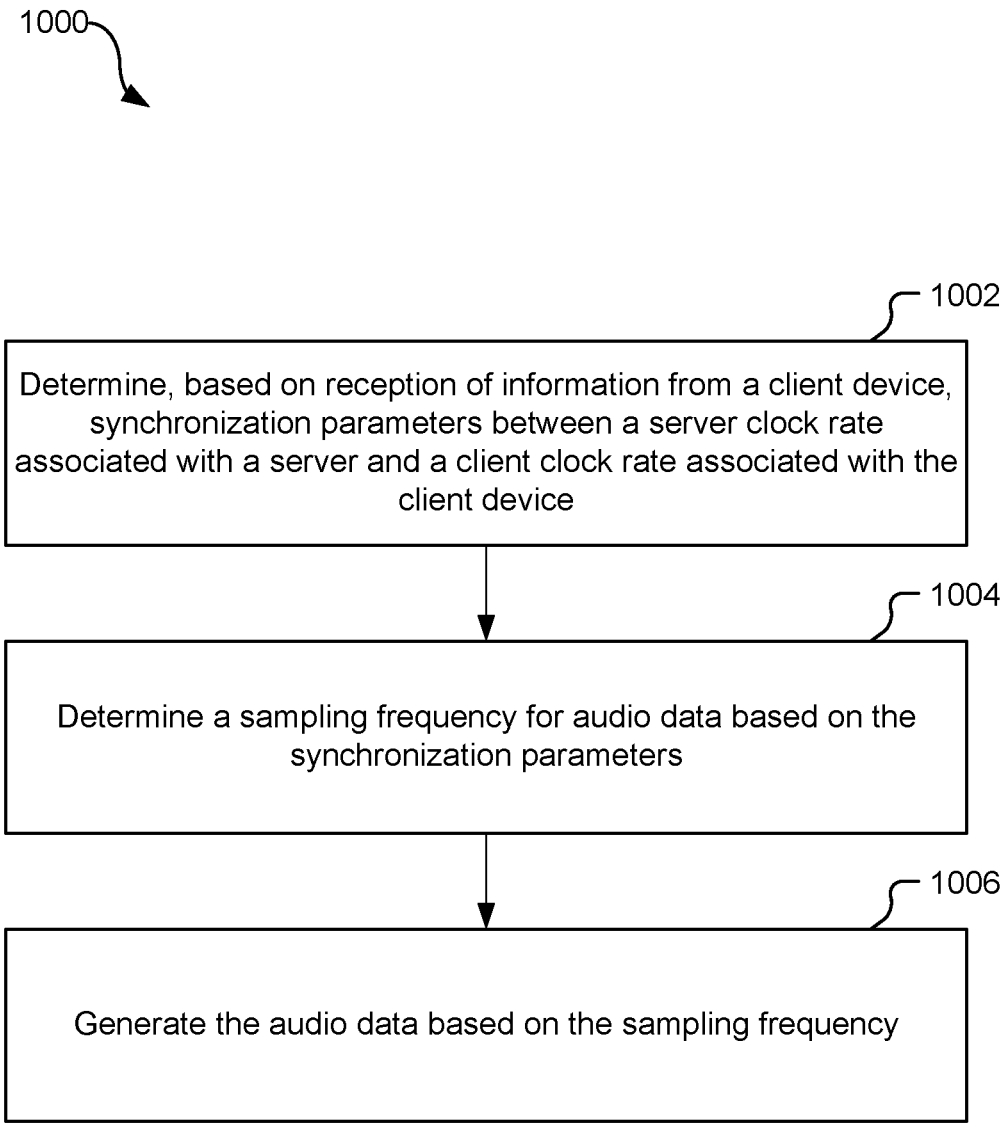
FIG. 10 illustrates a flowchart of a particular implementation of a method of adjusting a server-side audio frame generation rate based on a client-side playback rate.

FIG. 10 illustrates a flowchart of a particular implementation of a method 1000 of adjusting an audio frame generation rate at a server based on a client playback rate. The method 1000 can be performed by the server 100 of FIG. 1, the system 500 of FIG. 5A, or both.

The method 1000 includes determining, based on reception of information from a client device, synchronization parameters between a server clock rate associated with a server and a client clock rate associated with the client device, at 1002. For example, the synchronization parameter determination unit 122 determines the synchronization parameters 134 between the server clock rate 132 associated with the server 100 and the client clock rate 232 associated with the client device 200.

The method 1000 also includes determining a sampling frequency for audio data based on the synchronization parameters, at 1004. The sampling rate computation unit 550 determines the sampling frequency for audio frames that corresponds to the client-side playback rate based on the synchronization parameters 134. The method 1000 also includes generating the audio data based on the sampling frequency, at 1006. For example, the audio generator 334 generates sample-rate adjusted audio data based on the sampling frequency that corresponds to the client-side playback rate.

In a particular implementation, one or more components of the systems and devices disclosed herein may be integrated into a decoding system or apparatus (e.g., an electronic device, a CODEC, or a processor therein), into an encoding system or apparatus, or both. In other implementations, one or more components of the systems and devices disclosed herein may be integrated into a wireless telephone, a tablet computer, a desktop computer, a laptop computer, a set top box, a music player, a video player, an entertainment unit, a television, a game console, a navigation device, a communication device, a personal digital assistant (PDA), a fixed location data unit, a personal media player, or another type of device.

Figure 11:
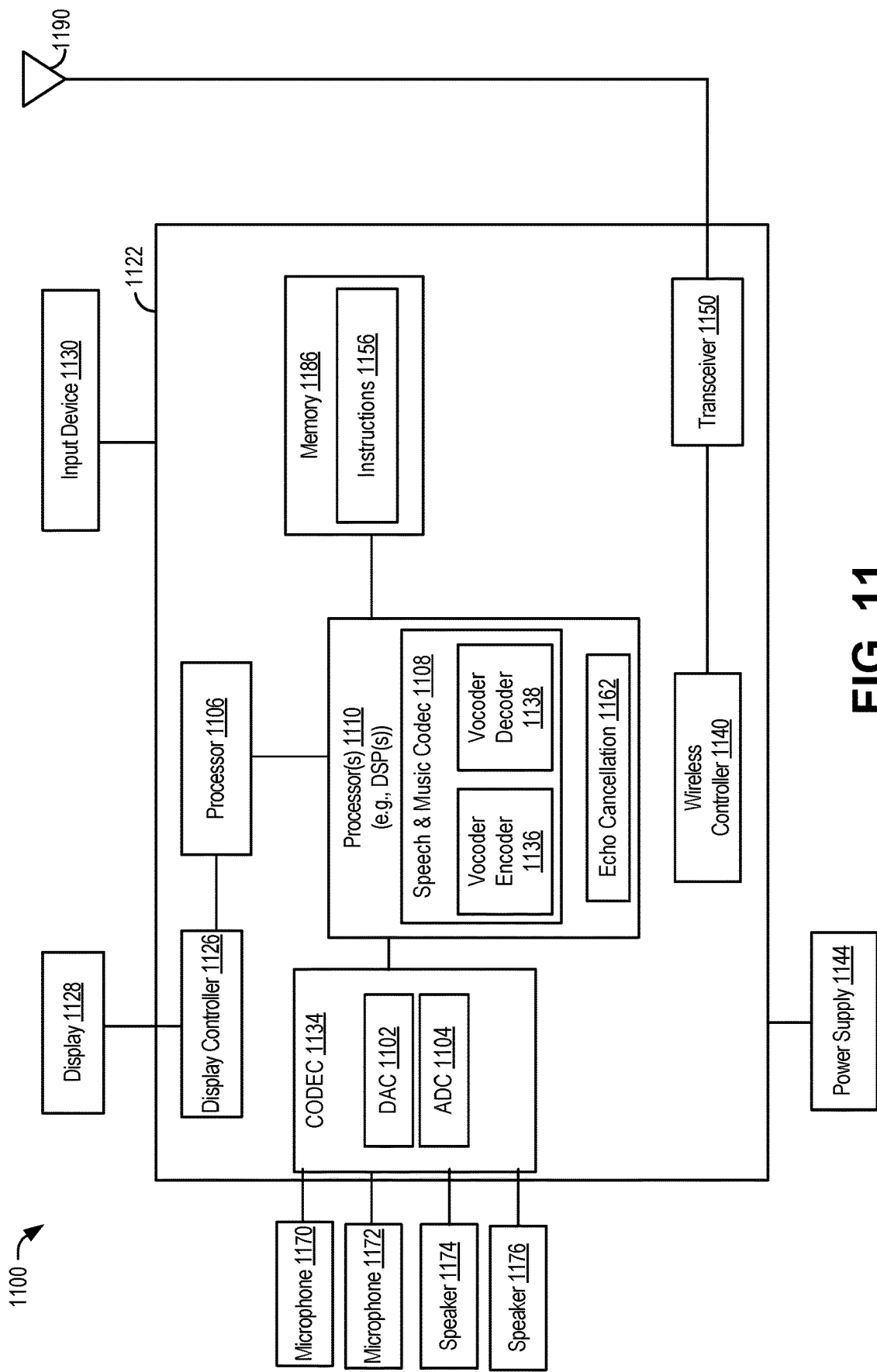
FIG. 11 is a block diagram of a particular illustrative example of a device that is operable to perform techniques described with reference to FIGS. 1-10.

Referring to FIG. 11, a block diagram of a particular illustrative implementation of a device is depicted and generally designated 1100. In various implementations, the device 1100 may have more or fewer components than illustrated in FIG. 11. In an illustrative implementation, the device 1100 may correspond to the server 100 or the client device 200. In an illustrative implementation, the device 1100 may perform one or more operations described with reference to FIGS. 1-10.

In a particular implementation, the device 1100 includes a processor 1106 (e.g., a central processing unit (CPU)). The device 1100 may include one or more additional processors 1110 (e.g., one or more DSPs). The processors 1110 may include a speech and music coder-decoder (CODEC) 1108 and an echo cancellation unit 1162. The speech and music codec 1108 may include a voice coder ("vocoder") encoder 1136, a vocoder decoder 1138, or both. In some implementations, the processor 1106, the one or more additional processors 1110, or a combination thereof, corresponds to the processor 102 or the processor 202.

The device 1100 may include a memory 1186 and a CODEC 1134. The memory 1186 may include instructions 1156, such as the instructions 110 or the instructions 210, that are executable by the one or more additional processors 1110 (or the processor 1106) to implement the functionality described with reference to one or more of the devices and methods of FIGS. 1-10. The device 1100 may include a wireless controller 1140 coupled, via a transceiver 1150, to an antenna 1190.

The device 1100 may include a display 1128 coupled to a display controller 1126. A first speaker 1174, a second speaker 1176, a first microphone 1170, and a second microphone 1172 may be coupled to the CODEC 1134. The CODEC 1134 may include a digital-to-analog converter 1102 and an analog-to-digital converter 1104. In a particular implementation, the CODEC 1134 may receive analog signals from the microphones 1170-1172, convert the analog signals to digital signals using the analog-to-digital converter 1104, and provide the digital signals to the speech and music codec 1108. The speech and music codec 1108 may process the digital signals. In a particular implementation, the speech and music codec 1108 may provide digital signals to the CODEC 1134. The CODEC 1134 may convert the digital signals to analog signals using the digital-to-analog converter 1102 and may provide the analog signals to the speakers 1174-1176.

In a particular implementation, the device 1100 may be included in a system-in-package or system-on-chip device 1122. In a particular implementation, the memory 1186, the processor 1106, the processors 1110, the display controller 1126, the CODEC 1134, and the wireless controller 1140 are included in a system-in-package or system-on-chip device 1122. In a particular implementation, an input device 1130 and a power supply 1144 are coupled to the system-on-chip device 1122. Moreover, in a particular implementation, as illustrated in FIG. 11, the display 1128, the input device 1130, the speakers 1174-1176, the microphones 1170-1172, the antenna 1190, and the power supply 1144 are external to the system-on-chip device 1122. In a particular implementation, each of the display 1128, the input device 1130, the speakers 1274-1276, the microphones 1170-1172, the antenna 1190, and the power supply 1144 may be coupled to a component of the system-on-chip device 1122, such as an interface or a controller.

The device 1100 may include a server, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, or any combination thereof.

In conjunction with the described techniques, a first apparatus includes means for receiving information from a client device. For example, the means for receiving may correspond to the receiver 104, one or more other circuits, components, or devices configured to receive information from a client device, or any combination thereof.

The first apparatus includes means for determining, based on reception of the information, synchronization parameters between a server clock rate associated with a server and a client clock rate associated with the client device. For example, the means for determining the synchronization parameters can correspond to the synchronization parameter determination unit 122, the server-client clock converter 602, one or more other circuits, components, or devices configured to determine, based on reception of the information, synchronization parameters between a server clock rate associated with a server and a client clock rate associated with the client device, or any combination thereof.

The first apparatus includes means for determining a client-side generation timestamp for an audio frame based on the synchronization parameters and based on a server-side generation timestamp for the audio frame. For example, the means for determining the client-side generation timestamp can correspond to the client timestamp generator 126, the client timestamp generator 604, one or more other circuits, components, or devices configured to determine a client-side timestamp for an audio frame based on the synchronization parameters and a server-side timestamp for the audio frame, or any combination thereof.

The first apparatus includes means for generating the audio frame. The audio frame includes the client-side generation timestamp. For example, the means for generating the audio frame can correspond to the audio frame generation unit 130, the audio generator 544, one or more other circuits, components, or devices configured to generate the audio frame, or any combination thereof.

The first apparatus includes means for transmitting the audio frame to the client device to enable the client device to playout the audio frame based on the client-side generation timestamp. For example, the means for transmitting the audio frame to the client device can include the transmitter 106, one or more other circuits, components, or devices configured to transmit the audio frame to the client device to enable the client device to playout the audio frame based on the client-side timestamp, or any combination thereof.

In conjunction with the described techniques, a second apparatus includes means for determining, based on reception of information from a client device, synchronization parameters between a server clock rate associated with the server and a client clock rate associated with the client device. For example, the means for determining the synchronization parameters may correspond to the synchronization parameter determination unit 122, one or more other circuits, components, or devices configured to determine, based on reception of the information, synchronization parameters between a server clock rate associated with a server and a client clock rate associated with the client device, or any combination thereof.

The second apparatus includes means for determining a sampling frequency for audio data based on the synchronization parameters. For example, the means for determining the sampling frequency may correspond to the sampling rate computation unit 550, one or more other circuits, components, or devices configured to determine a server-side sampling rate for audio data based on the synchronization parameters, or any combination thereof.

The second apparatus includes means for generating the audio data based on the sampling frequency. For example, the means for generating the audio data based on the sampling frequency may correspond to the audio generator 554, one or more other circuits, components, or devices configured to generate the audio data based on the server-side sampling rate, or any combination thereof.

In accordance with the described techniques, a third apparatus includes means for receiving a plurality of audio frames from a server, each audio frame of the plurality of audio frames including a corresponding server-side generation timestamp indicating a generation time of the corresponding audio frame. For example, the means for receiving a plurality of audio frames from a server can include the receiver 204, the jitter buffer 230, one or more other circuits, components, or devices configured to receive a plurality of audio frames from a server, each audio frame of the plurality of audio frames including a corresponding server-side generation timestamp indicating a generation time of the corresponding audio frame, or any combination thereof.

The third apparatus includes means for determining a sampling frequency based on the server-side generation timestamps and based on client-side receive timestamps, each client-side receive timestamp indicating a reception time of a corresponding audio frame. For example, the means for determining a sampling frequency based on the server-side generation timestamps and based on the client-side receive timestamps can include the sampling frequency determination unit 226, one or more other circuits, components, or devices configured to determine a server-side sampling frequency based on the server-side timestamps, or any combination thereof.

The third apparatus also includes means for adjusting a playback rate at the client device to match the sampling frequency. For example, the means for adjusting a playback rate at the client device to match the sampling frequency can include the playback rate adjuster 228, one or more other circuits, components, or devices configured to adjust a playback rate at the client device to match the sampling frequency, or any combination thereof.

In accordance with the described techniques, a fourth apparatus includes means for receiving a plurality of audio frames from a server, each audio frame of the plurality of audio frames including a corresponding client-side generation timestamp indicating a generation time of the corresponding audio frame in a client-clock domain. For example, the means for receiving a plurality of audio frames can include the receiver 204, the jitter buffer 230, one or more other circuits, components, or devices configured to receive a plurality of audio frames, or any combination thereof.

The fourth apparatus also includes means for determining a sampling frequency, in the client-clock domain, of the server, where the sampling frequency is determined based on the client-side generation timestamps. For example, the means for determining the sampling frequency can correspond to the sampling frequency determination unit 226, one or more other circuits, components, or devices configured to determine the sampling frequency, in the client-clock domain, of the server, where the sampling frequency is determined based on the client-side generation timestamps, or any combination thereof.

The fourth apparatus also includes means for adjusting the playback rate at a client device based on the sampling frequency. For example, the means for adjusting the playback rate can include the playback rate adjuster 228, one or more other circuits, components, or devices configured to adjust the playback rate at a client device based on the sampling frequency, or any combination thereof.

In accordance with various aspects of the present disclosure, a server, a client device, or both, may be configured to operate in accordance with one or more of the following clauses.

Clause 1. An apparatus comprising: a server including a processor configured to: determine, based on reception of information from a client device, synchronization parameters between a server clock rate associated with the server and a client clock rate associated with the client device; determine a client-side generation timestamp for an audio frame based on the synchronization parameters and based on a server-side generation timestamp for the audio frame; and generate the audio frame, the audio frame including the client-side timestamp.

Clause 2. The apparatus of clause 1, further comprising a receiver coupled to the processor, the receiver configured to receive the information from the client device.

Clause 3. The apparatus of clause 1, further comprising a transmitter coupled to the processor, the transmitter configured to transmit the audio frame to the client device to enable the client device to playout the audio frame based on the client-side generation timestamp.

Clause 4. The apparatus of clause 3, wherein the transmitter is further configured to transmit a plurality of video frames to the client device in a video stream transmission that is separate from an audio stream transmission, the audio stream transmission including the audio frame, and the plurality of video frames associated with the audio stream transmission to enable synchronized audio and video playback at the client device.

Clause 5. The apparatus of clause 4, wherein transmission of the video stream transmission separately from transmission of the audio stream transmission enables the client device to continuously playout audio frames in the audio stream transmission during a delay associated with the video stream transmission.

Clause 6. The apparatus of clause 5, wherein the client-side generation timestamps enable synchronization of the audio stream transmission and the video stream transmission at the client device after the delay.

Clause 7. The apparatus of clause 1, wherein the client device comprises a head mounted device.

Clause 8. The apparatus of clause 7, wherein the head mounted device comprises one of a virtual reality device, a mixed reality device, or an augmented reality device.

Clause 9. The apparatus of clause 1, wherein the synchronization parameters comprise: a drift value indicative of a drift between the server clock rate and the client clock rate; and an offset value indicative of an offset between a server clock value and a client clock value.

Clause 10. The apparatus of clause 9, wherein the information comprises a plurality of head pose samples received as transmissions from the client device, each head pose sample indicative of an orientation of the client device at a corresponding time.

Clause 11. The apparatus of clause 10, wherein determination of the drift between the server clock rate and the client clock rate comprises: reception, at a first time, of a first head pose sample of the plurality of head pose samples, the first head pose sample having a first client-side timestamp indicating a generation time of the first head pose sample; reception, at a second time, of a second head pose sample of the plurality of head pose samples, the second head pose sample having a second client-side timestamp indicating a generation time of the second head pose sample; and performance of a least squares estimation to determine the drift, the least squares estimation based on at least a time associated with the first client-side timestamp, the first time, a time associated with the second client-side timestamp, and the second time.

Clause 12. The apparatus of clause 11, wherein the offset is based on the drift, a mean time associated with client-side timestamps used in determining the drift, and a mean time of reception for head pose samples used in determining the drift.

Clause 13. A method of generating timing information for a client device, the method comprising: receiving, at a server, information from the client device; determining, based on reception of the information, synchronization parameters between a server clock rate associated with the server and a client clock rate associated with the client device; determining a client-side generation timestamp for an audio frame based on the synchronization parameters and based on a server-side generation timestamp for the audio frame; generating the audio frame, the audio frame including the client-side generation timestamp; and transmitting the audio frame to the client device to enable the client device to playout the audio frame based on the client-side generation timestamp.

Clause 14. A non-transitory computer-readable medium comprising instructions for generating timing information for a client device, the instructions, when executed by one or more processors of a server, cause the one or more processors to perform operations comprising: determining, based on reception of information from the client device, synchronization parameters between a server clock rate associated with the server and a client clock rate associated with the client device; determining a client-side generation timestamp for an audio frame based on the synchronization parameters and based on a server-side generation timestamp for the audio frame; generating the audio frame, the audio frame including the client-side generation timestamp; and initiating transmission of the audio frame to the client device to enable the client device to playout the audio frame based on the client-side generation timestamp.

Clause 15. An apparatus comprising: means for receiving information from a client device; means for determining, based on reception of the information, synchronization parameters between a server clock rate associated with a server and a client clock rate associated with the client device; means for determining a client-side generation timestamp for an audio frame based on the synchronization parameters and based on a server-side generation timestamp for the audio frame; means for generating the audio frame, the audio frame including the client-side generation timestamp; and means for transmitting the audio frame to the client device to enable the client device to playout the audio frame based on the client-side generation timestamp.

Clause 16. A method of adjusting a playback rate, the method comprising: receiving, at a client device, a plurality of audio frames from a server, each audio frame of the plurality of audio frames including a corresponding client-side generation timestamp indicating the generation time of the corresponding audio frame in a client-clock domain; determining a sampling frequency, in the client-clock domain, of the server, wherein the sampling frequency is determined based on the client-side generation timestamps; and adjusting the playback rate at the client device based on the sampling frequency.

Clause 17. The method of clause 16, further comprising, prior to adjusting the playback rate: comparing an average buffer occupancy to a target buffer occupancy, the average buffer occupancy indicating an average number of audio frames stored at a jitter buffer of the client device over a particular time span; and increasing the playback rate at the client device to reduce the average buffer occupancy to the target buffer occupancy during a fixed time duration, wherein the playback rate is adjusted to match the sampling frequency after the fixed time duration.

Clause 18. An apparatus comprising a client device comprising: a receiver configured to receive a plurality of audio frames from a server, each audio frame of the plurality of audio frames including a corresponding client-side generation timestamp indicating the generation time of the corresponding audio frame in a client-clock domain; and a processor coupled to the receiver, the processor configured to: determine a sampling frequency, in the client-clock domain, of the server, wherein the sampling frequency is determined based on the client-side generation timestamps; and adjust a playback rate at the client device based on the sampling frequency.

Clause 19. The apparatus of clause 18, wherein the processor is further configured to: compare an average buffer occupancy to a target buffer occupancy, the average buffer occupancy indicating an average number of audio frames stored at a jitter buffer of the client device over a particular time span; and increase the playback rate at the client device to reduce the average buffer occupancy to the target buffer occupancy during a fixed time duration, wherein the playback rate is adjusted to match the sampling frequency after the fixed time duration.

Clause 20. A non-transitory computer-readable medium comprising instructions for adjusting a playback rate, the instructions, when executed by one or more processors of a client device, cause the one or more processors to perform operations comprising: receiving, at the client device, a plurality of audio frames from a server, each audio frame of the plurality of audio frames including a corresponding client-side generation timestamp indicating the generation time of the corresponding audio frame in a client-clock domain; determining a sampling frequency, in the client-clock domain, of the server, wherein the sampling frequency is determined based on the client-side generation timestamps; and adjusting the playback rate at the client device based on the sampling frequency.

Clause 21. The non-transitory computer-readable medium of clause 21, wherein the operations further include: comparing an average buffer occupancy to a target buffer occupancy, the average buffer occupancy indicating an average number of audio frames stored at a jitter buffer of the client device over a particular time span; and increasing the playback rate at the client device to reduce the average buffer occupancy to the target buffer occupancy during a fixed time duration, wherein the playback rate is adjusted to match the sampling frequency after the fixed time duration.

Clause 22. An apparatus comprising: means for receiving, at a client device, a plurality of audio frames from a server, each audio frame of the plurality of audio frames including a corresponding client-side generation timestamp indicating the generation time of the corresponding audio frame in a client-clock domain; means for determining a sampling frequency, in the client-clock domain, of the server, wherein the sampling frequency is determined based on the client-side generation timestamps; and means for adjusting the playback rate at the client device based on the sampling frequency.

Clause 23. The apparatus of clause 22, further comprising: means for comparing an average buffer occupancy to a target buffer occupancy, the average buffer occupancy indicating an average number of audio frames stored at a jitter buffer of the client device over a particular time span; and means for increasing the playback rate at the client device to reduce the average buffer occupancy to the target buffer occupancy during a fixed time duration, wherein the playback rate is adjusted to match the sampling frequency after the fixed time duration.

Clause 24. An apparatus comprising a client device comprising: a processor configured to: receive a plurality of audio frames from a server, each audio frame of the plurality of audio frames including a corresponding server-side generation timestamp indicating a generation time of the corresponding audio frame; determine a sampling frequency based on the server-side generation timestamps and based on client-side receive timestamps, each client-side receive timestamp indicating a reception time of a corresponding audio frame; and adjust a playback rate at the client device to match the sampling frequency.

Clause 25. The apparatus of clause 24, wherein, to determine the sampling frequency, the processor is further configured to perform a least squares estimation based on at least the server-side generation timestamps and the client-side receive timestamps.

Clause 26. The apparatus of clause 24, wherein the processor is further configured to: compare an average buffer occupancy to a target buffer occupancy, the average buffer occupancy indicating an average number of audio frames stored at a jitter buffer of the client device over a particular time span; and increase the playback rate at the client device to reduce the average buffer occupancy to the target buffer occupancy during a fixed time duration, wherein the playback rate is adjusted to match the sampling frequency after the fixed time duration.

Clause 27. A method of adjusting a playback rate, the method comprising: receiving, at a client device, a plurality of audio frames from a server, each audio frame of the plurality of audio frames including a corresponding server-side generation timestamp indicating a generation time of the corresponding audio frame; determining a sampling frequency based on the server-side generation timestamps and based on client-side receive timestamps, each client-side receive timestamp indicating a reception time of a corresponding audio frame; and adjusting the playback rate at the client device to match the sampling frequency.

Clause 28. The method of clause 27, wherein determining the sampling frequency comprises: performing a least squares estimation based on at least the server-side generation timestamps and the client-side receive timestamps.

Clause 29. The method of clause 27, further comprising, prior to adjusting the playback rate to match the sampling frequency: comparing an average buffer occupancy to a target buffer occupancy, the average buffer occupancy indicating an average number of audio frames stored at a jitter buffer of the client device over a particular time span; and increasing the playback rate at the client device to reduce the average buffer occupancy to the target buffer occupancy during a fixed time duration, wherein the playback rate is adjusted to match the server-side sampling frequency after the fixed time duration.

Clause 30. A non-transitory computer-readable medium comprising instructions for adjusting a playback rate, the instructions, when executed by one or more processors of a client device, cause the one or more processors to perform operations comprising: receiving a plurality of audio frames from a server, each audio frame of the plurality of audio frames including a corresponding server-side generation timestamp indicating a generation time of the corresponding audio frame; determining a sampling frequency based on the server-side generation timestamps and based on client-side receive timestamps, each client-side receive timestamp indicating a reception time of a corresponding audio frame; and adjusting the playback rate at the client device to match the sampling frequency.

Clause 31. The non-transitory computer-readable medium of clause 30, wherein determining the sampling frequency comprises: performing a least squares estimation based on at least the server-side generation timestamps and the client-side receive timestamps.

Clause 32. The non-transitory computer-readable medium of clause 30, wherein the operations further comprise: comparing an average buffer occupancy to a target buffer occupancy, the average buffer occupancy indicating an average number of audio frames stored at a jitter buffer of the client device over a particular time span; and increasing the playback rate at the client device to reduce the average buffer occupancy to the target buffer occupancy during a fixed time duration, wherein the playback rate is adjusted to match the server-side sampling frequency after the fixed time duration.

Clause 33. An apparatus comprising: means for receiving a plurality of audio frames from a server, each audio frame of the plurality of audio frames including a corresponding server-side generation timestamp indicating a generation time of the corresponding audio frame; means for determining a sampling frequency based on the server-side generation timestamps and based on client-side receive timestamps, each client-side receive timestamp indicating a reception time of a corresponding audio frame; and means for adjusting a playback rate at a client device to match the sampling frequency.

Clause 34. An apparatus comprising a server comprising: a processor configured to: determine, based on reception of information from a client device, synchronization parameters between a server clock rate associated with the server and a client clock rate associated with the client device; determine a sampling frequency for audio data based on the synchronization parameters; and generate the audio data based on the sampling frequency.

Those of skill would further appreciate that the various illustrative logical blocks, configurations, modules, circuits, and algorithm steps described in connection with the implementations disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:
a server comprising:
a processor configured to:
receive information including a plurality of head pose samples from a client device, each head pose sample indicative of an orientation of the client device at a corresponding time;
determine, based on the information, synchronization parameters between a server clock rate associated with the server and a client clock rate associated with the client device;
determine a client-side generation timestamp for an audio frame based on the synchronization parameters and based on a server-side generation timestamp for the audio frame; and
generate the audio frame, the audio frame including the client-side generation timestamp.

2. The apparatus of claim 1, further comprising a receiver coupled to the processor, the receiver configured to receive the information from the client device.

3. The apparatus of claim 1, further comprising a transmitter coupled to the processor, the transmitter configured to transmit the audio frame to the client device to enable the client device to playout the audio frame based on the client-side generation timestamp.

4. The apparatus of claim 3, wherein the transmitter is further configured to transmit a plurality of video frames to the client device in a video stream transmission that is separate from an audio stream transmission, the audio stream transmission including the audio frame, and the plurality of video frames associated with the audio stream transmission to enable synchronized audio and video playback at the client device.

5. The apparatus of claim 4, wherein transmission of the video stream transmission separately from transmission of the audio stream transmission enables the client device to continuously playout audio frames in the audio stream transmission during a delay associated with the video stream transmission.

6. The apparatus of claim 5, wherein client-side generation timestamps in the audio frames enable synchronization of the audio stream transmission and the video stream transmission at the client device after the delay.

7. The apparatus of claim 1, wherein the client device comprises a head mounted device.

8. The apparatus of claim 7, wherein the head mounted device comprises one of a virtual reality device, a mixed reality device, or an augmented reality device.

9. The apparatus of claim 1, wherein the synchronization parameters comprise:
a drift value indicative of a drift between the server clock rate and the client clock rate; and
an offset value indicative of an offset between a server clock value and a client clock value.

10. The apparatus of claim 1, wherein the processor is configured to:
receive a first head pose sample of the plurality of head pose samples at a first time, the first head pose sample having a first client-side timestamp indicating a generation time of the first head pose sample;
receive a second head pose sample of the plurality of head pose samples at a second time, the second head pose sample having a second client-side timestamp indicating a generation time of the second head pose sample; and
generate an estimate of at least one of the synchronization parameters based on a time associated with the first client-side timestamp, the first time, a time associated with the second client-side timestamp, and the second time.

11. The apparatus of claim 9, wherein determination of the drift between the server clock rate and the client clock rate comprises:
reception, at a first time, of a first head pose sample of the plurality of head pose samples, the first head pose sample having a first client-side timestamp indicating a generation time of the first head pose sample;
reception, at a second time, of a second head pose sample of the plurality of head pose samples, the second head pose sample having a second client-side timestamp indicating a generation time of the second head pose sample; and
performance of a least squares estimation to determine the drift, the least squares estimation based on at least a time associated with the first client-side timestamp, the first time, a time associated with the second client-side timestamp, and the second time.

12. The apparatus of claim 11, wherein the offset is based on the drift, a mean time associated with client-side timestamps used in determining the drift, and a mean time of reception for head pose samples used in determining the drift.

13. A method of generating timing information for a client device, the method comprising:
receiving, at a server, information comprising a plurality of head pose samples received as transmissions from a client device, each head pose sample indicative of an orientation of the client device at a corresponding time;
determining, based on the information, synchronization parameters between a server clock rate associated with the server and a client clock rate associated with the client device;
determining a client-side generation timestamp for an audio frame based on the synchronization parameters and based on a server-side generation timestamp for the audio frame;
generating the audio frame, the audio frame including the client-side generation timestamp; and
transmitting the audio frame to the client device to enable the client device to playout the audio frame based on the client-side generation timestamp.

14. The method of claim 13, further comprising transmitting a plurality of video frames to the client device in a video stream transmission that is separate from an audio stream transmission, the audio stream transmission including the audio frame, and the plurality of video frames associated with the audio stream transmission to enable synchronized audio and video playback at the client device.

15. The method of claim 14, wherein transmission of the video stream transmission separately from transmission of the audio stream transmission enables the client device to continuously playout audio frames in the audio stream transmission during a delay associated with the video stream transmission.

16. The method of claim 15, wherein client-side generation timestamps in the audio frames enable synchronization of the audio stream transmission and the video stream transmission at the client device after the delay.

17. The method of claim 13, wherein the client device comprises a head mounted device.

18. The method of claim 17, wherein the head mounted device comprises one of a virtual reality device, a mixed reality device, or an augmented reality device.

19. The method of claim 13, wherein the synchronization parameters comprise:
a drift value indicative of a drift between the server clock rate and the client clock rate; and
an offset value indicative of an offset between a server clock value and a client clock value.

20. The method of claim 13, wherein:
a first head pose sample of the plurality of head pose samples is received at a first time, the first head pose sample having a first client-side timestamp indicating a generation time of the first head pose sample;
a second head pose sample of the plurality of head pose samples is received at a second time, the second head pose sample having a second client-side timestamp indicating a generation time of the second head pose sample; and
an estimate of at least one of the synchronization parameters is generated based on a time associated with the first client-side timestamp, the first time, a time associated with the second client-side timestamp, and the second time.

21. The method of claim 19, wherein determination of the drift between the server clock rate and the client clock rate comprises:
receiving, at a first time, a first head pose sample of the plurality of head pose samples, the first head pose sample having a first client-side timestamp indicating a generation time of the first head pose sample;
receiving, at a second time, a second head pose sample of the plurality of head pose samples, the second head pose sample having a second client-side timestamp indicating a generation time of the second head pose sample; and
performing a least squares estimation to determine the drift, the least squares estimation based on at least a time associated with the first client-side timestamp, the first time, a time associated with the second client-side timestamp, and the second time.

22. The method of claim 21, wherein the offset is based on the drift, a mean time associated with client-side timestamps used in determining the drift, and a mean time of reception for head pose samples used in determining the drift.

23. A non-transitory computer-readable medium comprising instructions for generating timing information for a client device, the instructions, when executed by one or more processors of a server, cause the one or more processors to:
determine, based on reception of information comprising a plurality of head pose samples received as transmissions from the client device, each head pose sample indicative of an orientation of the client device at a corresponding time, synchronization parameters between a server clock rate associated with the server and a client clock rate associated with the client device;
determine a client-side generation timestamp for an audio frame based on the synchronization parameters and based on a server-side generation timestamp for the audio frame;
generate the audio frame, the audio frame including the client-side generation timestamp; and
initiate transmission of the audio frame to the client device to enable the client device to playout the audio frame based on the client-side generation timestamp.

24. The non-transitory computer-readable medium of claim 23, wherein the instructions, when executed by the one or more processors, further cause the one or more processors to transmit a plurality of video frames to the client device in a video stream transmission that is separate from an audio stream transmission, the audio stream transmission including the audio frame, and the plurality of video frames associated with the audio stream transmission to enable synchronized audio and video playback at the client device.

25. The non-transitory computer-readable medium of claim 23, wherein the synchronization parameters comprise:
a drift value indicative of a drift between the server clock rate and the client clock rate; and
an offset value indicative of an offset between a server clock value and a client clock value.

26. The non-transitory computer-readable medium of claim 25, wherein determination of the drift between the server clock rate and the client clock rate comprises:
reception, at a first time, of a first head pose sample of the plurality of head pose samples, the first head pose sample having a first client-side timestamp indicating a generation time of the first head pose sample;
reception, at a second time, of a second head pose sample of the plurality of head pose samples, the second head pose sample having a second client-side timestamp indicating a generation time of the second head pose sample; and
performance of a least squares estimation to determine the drift, the least squares estimation based on at least a time associated with the first client-side timestamp, the first time, a time associated with the second client-side timestamp, and the second time.

27. The non-transitory computer-readable medium of claim 26, wherein the offset is based on the drift, a mean time associated with client-side timestamps used in determining the drift, and a mean time of reception for head pose samples used in determining the drift.

28. An apparatus comprising:
means for receiving information comprising a plurality of head pose samples received as transmissions from a client device, each head pose sample indicative of an orientation of the client device at a corresponding time;
means for determining, based on reception of the information, synchronization parameters between a server clock rate associated with a server and a client clock rate associated with the client device;
means for determining a client-side generation timestamp for an audio frame based on the synchronization parameters and based on a server-side generation timestamp for the audio frame;
means for generating the audio frame, the audio frame including the client-side generation timestamp; and
means for transmitting the audio frame to the client device to enable the client device to playout the audio frame based on the client-side generation timestamp.

29. The apparatus of claim 28, wherein the means for transmitting is further configured to transmit a plurality of video frames to the client device in a video stream transmission that is separate from an audio stream transmission, the audio stream transmission including the audio frame, and the plurality of video frames associated with the audio stream transmission to enable synchronized audio and video playback at the client device.

30. The apparatus of claim 28, wherein the synchronization parameters comprise:

a drift value indicative of a drift between the server clock rate and the client clock rate; and an offset value indicative of an offset between a server clock value and a client clock value.

* * * * *